United States Patent [19]
Ito

[11] 3,890,448
[45] June 17, 1975

[54] HEATABLE PACKAGE OF FOOD

[75] Inventor: Senji Ito, Yokohama, Japan

[73] Assignee: Toyo Seikan Kaisha Limited, Tokyo, Japan

[22] Filed: Aug. 17, 1972

[21] Appl. No.: 281,407

[30] Foreign Application Priority Data
Oct. 5, 1971 Japan............................... 46-77539
Feb. 1, 1972 Japan............................... 47-10951
Feb. 1, 1972 Japan............................... 47-12752
Mar. 25, 1972 Japan............................... 47-30047

[52] U.S. Cl............. 426/126; 117/161 P; 161/214; 161/227; 220/64; 229/3.5 MF; 229/43; 260/78 TF; 426/106; 426/131; 426/412
[51] Int. Cl........................................... B65b 25/22
[58] Field of Search ........... 426/126, 127, 113, 131, 426/415, 106, 412, 410, 129; 161/214, 227; 260/78 TF; 117/161 P; 220/64; 229/3.5 MF, 229/43

[56] References Cited
UNITED STATES PATENTS

| | | | |
|---|---|---|---|
| 3,179,634 | 4/1965 | Edwards........................ | 161/227 X |
| 3,469,998 | 9/1969 | Cane................................ | 426/106 X |
| 3,531,300 | 9/1970 | Greenberg..................... | 426/412 X |
| 3,532,673 | 10/1970 | Bell, Jr. et al.................. | 260/78 TF |
| 3,534,003 | 10/1970 | Holub et al..................... | 161/214 X |
| 3,550,806 | 12/1970 | Peerman et al................ | 161/214 X |
| 3,597,392 | 8/1971 | Bach et al....................... | 161/227 X |
| 3,615,706 | 10/1971 | Robinson........................ | 426/113 X |
| 3,642,720 | 2/1972 | Kray et al. ..................... | 161/214 X |
| 3,663,239 | 5/1972 | Rowe............................... | 426/113 |
| 3,666,723 | 5/1972 | Kray et al. ..................... | 161/214 X |
| 3,773,589 | 11/1973 | Kaiser............................. | 161/227 X |
| 3,803,103 | 4/1974 | Macay ............................ | 161/214 X |

Primary Examiner—Frank W. Lutter
Assistant Examiner—Steven L. Weinstein
Attorney, Agent, or Firm—Diller, Brown, Ramik & Wight

[57] ABSTRACT

A heatable package of food comprising a food product encased in a packaging container, said packaging container being composed of at least one sheet material consisting of a metal sheet and having at least one the inner surface thereof a protective coating layer of a heat resistant resin selected from the group consisting of polyimide resins and polyimidazole resins, said sheet material having a thickness of 5 to 500 microns.

12 Claims, 12 Drawing Figures

Fig. 1
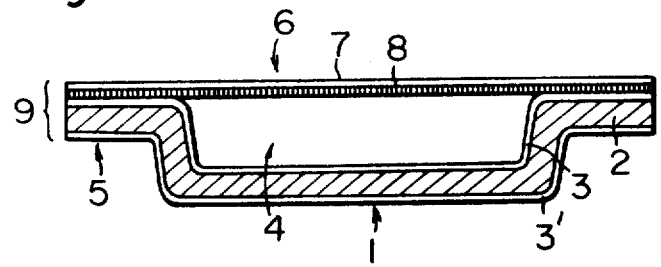
Fig. 2
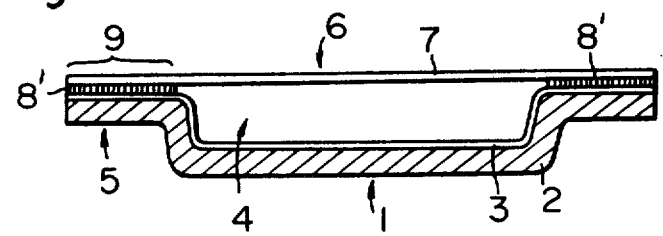
Fig. 3-A
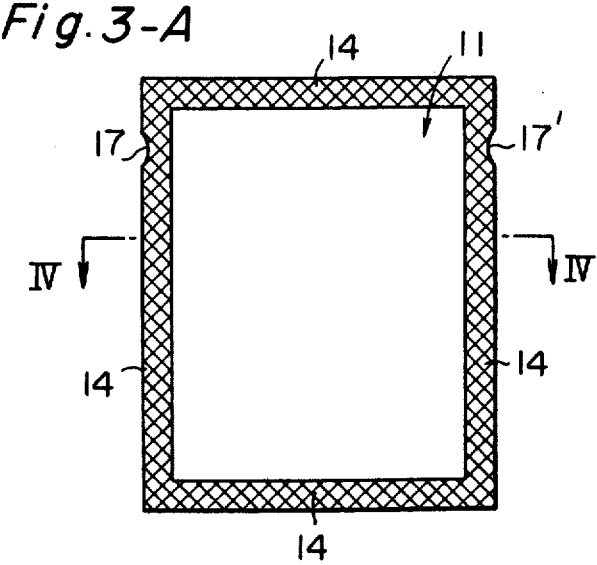

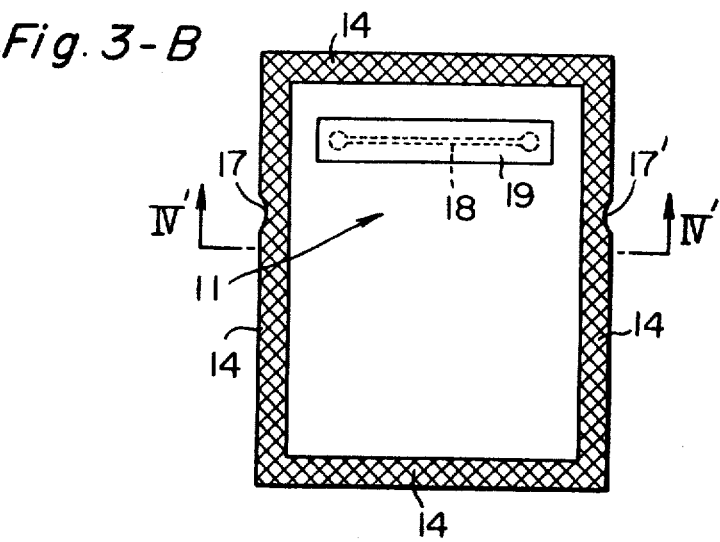
Fig. 3-B
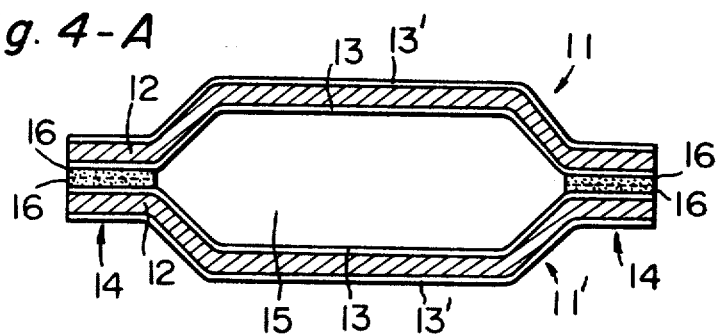
Fig. 4-A
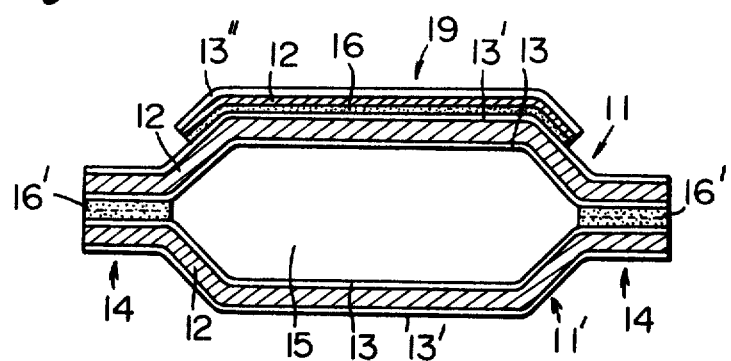
Fig. 4-B

HEATABLE PACKAGE OF FOOD

This invention relates to a heatable package of food, and more particularly, it relates to a package of food in which encased food can be heated by allowing the package to have a direct contact with fire prior to eating and which is excellent in the food-preserving property, the flavor-retaining property, the characteristics required in food sanitation, and the sealing property.

As a retortable sealed package for preserving food products there have been broadly used bag-like packages formed by laminating a film of a polyester (polyethylene terephthalate) and a film of a polyolefin directly or with an aluminum foil interposed therebetween. These packaging bags are retortable and excellent in the sealing property and are advantageous in that encased food products can be preserved without freezing. However, when they are heated prior to eating, a special treatment such as boiling in hot water is required. Namely, they are defective in that it is impossible to heat encased food products by allowing the packaging materials to have a direct contact with fire.

Food packaging materials that can be heated by a direct contact with fire have also been known in the art. For instance, packaging materials composed of a press-molded aluminum foil container and an aluminum foil lid covering the container have broadly been used as such packaging material heatable by a direct contact with fire. However, since packaging containers of this type are inferior in the sealing property and food-preserving property, their use is limited for preservation of refrigerated food products.

Recently, a packaging container heatable by a direct contact with fire comprising a layer of a thick paper and a polyester layer, both layers being integrated with each other by means of an interposing polyurethane layer, has been proposed in Japanese Utility Model Laid-Open Specification. No. 102/71. However, when it is heated by a direct contact with fire, the heating temperature is limited to such a low level as up to 250°C., and moreover, it is insufficient in the sealing property and food-preserving property. Therefore, it can be used only as a substitute for a pan or as a packaging material for a refrigerated food.

Specifications of U.S. Pat. No. 3,469,998 and U.S. Pat. No. 3,554,770 disclose a food-packaging material comprising a metal foil, the inner surface of which is coated with a polyvinyl chloride resin and the outer surface of which is coated with a heat-resistant resin such as an epoxy resin, and it is taught that when such packaging material is put into a toaster, encased food can be heated. Packaging materials of this type are sufficient in that encased food products can be sealed and be prevented from having a direct contact with the metal foil. However, they are still insufficient in that a nasty taste or smell tends to soak into encased food products during storage or heating or the coating material is eluted into encased food products.

As another type of food packages there may be mentioned so-called canned provisions. In manufacture of can bodies for canned provisions, in general, metal blanks having a primer coating on the surface thereof are confronted at side ends and they are bonded by heat fusion of a hot melt adhesive. As the primer coating there are broadly used, for instance, epoxy-phenol resins and epoxy-urea resins, and as the hot melt adhesive, various polyamides, copolyamides and modified polyamides are used. However, since can bodies formed by such known technique are still defective with respect to heat resistance or hot water resistance, it is generally difficult to apply such can bodies to uses where encased provisions are subjected to heating sterilization treatment or they are heated by a direct contact with fire before eating. Therefore, their use is generally limited to preservation of drinks or the like. It may be considered that the above defect will be overcome by employing a heat-resistant resin as a primer coating and using a thermoplastic resin having a high melting point as a hot melt adhesive in combination with such heat resistant resin for the primer coating. However, since resins excellent in heat resistance, such as fluorine resins, are in general chemically inactive, it is difficult to form strong bondings excellent in peel strength between such heat resistant resins and hot melt adhesives.

As mentioned above, conventional packaging containers for use in preservation of foodstuffs are all insufficient in some points or others. For instance, containers excellent in properties of sealing and preserving encased food are generally inferior with respect to the heat resistance of the containers per se, and therefore, in these containers it is impossible or difficult to heat encased food by a direct contact with fire. On the other hand, food containers in which encased food can be heated by a direct contact with fire are defective in that they are insufficient in properties of sealing and preserving the encased food. As far as I know, there has not been known a food packaging container that is excellent in both the above points, namely a container that is excellent in properties of sealing and preserving encased food and can sufficiently undergo a direct contact with fire for heating encased food. Moreover, in known containers for preserving foodstuffs, a nasty taste or smell tends to soak into contents or a material constituting the container is likely to be eluted into contents during storage or heating. In the instant specification, by the term "property of preserving food" or "food-preserving property" is meant such a property of a container or packaging material that encased food can be preserved by it without degradation even if any special treatment for preservation, such as freezing treatment, is not effected.

I have found that a coated structure comprising a metal plate, at least the inner surface of which is coated with a layer of a polyimide or polyimidazole resin, can be molded into a container of an optional form; a container composed of such coated structure has not tendency to impart a nasty taste or smell to contents not only during storage but also when it is heated at such a high temperature as 400° to 500°C. by a direct contact with fire, and it is free of such property that the container-constituting material is extracted or eluted by contents during storage or under such heating by a direct contact with fire; and that the polyimide or polyimidazole resin layer on the metal plate is tightly and closely bonded by heating to a layer of a heat-fusable resin such as a polyamide resin, to thereby form an excellent sealing structure which can sufficiently endure a high temperature sterilization treatment such as retorting treatment.

An object of this invention is to provide a novel package of food in which encased food can be heated in the state contained in the package prior to eating by a direct contact with fire and which keeps excellent flavor-retaining property and good characteristics required in food sanitation not only during storage but also at heating by a direct contact with fire prior to eating.

Another object of this invention is to provide a heatable package for sealing food therein which has excellent properties of sealing and preserving encased food and which can sufficiently endure heating by a direct contact with fire effected prior to eating.

Still another object of this invention is to provide a food-sealing package which can readily be formed by simple molding operation, and in which the sealing or retorting operation can be accomplished very easily after filling of food and during long time storage, transportation or direct fire heating prior to eating, flavor, fragrance and properties of contents are not degraded or breakages of the sealing are not caused to occur.

In accordance with this invention there is provided a heatable package of food comprising a food product encased in a packaging container, said packaging container being composed of at least one sheet material consisting of a metal sheet having a thickness of $5\mu$ to $100\ \mu$ and having at least on the inner surface thereof a protective coating layer of a heat resistant resin selected from the group consisting of polyimide resins and polyimidazole resins, said coating layer preferably having thickness of $1\ \mu$ to $10\ \mu$.

The invention will be better understood from the accompanying drawings.

FIGS. 1 and 2 each illustrate the section of a package of food according to this invention which comprises a packaging container composed of a semi-hard or hard molded container proper and a lid appended thereto.

FIGS. 3–A and 4–A illustrate the plane and section of a package of food according to this invention, which comprises a packaging container composed of a flexible bag, FIG. 4–A illustrating the section taken along the line IV–IV in FIG. 3–A.

FIGS. 3–B and 4–B illustrate the plane and section of another embodiment of a package of food comprising a packaging container composed of a flexible bag, FIG. 4–B illustrating the section taken along the line IV' — IV' in FIG. 3–B.

Figure 5:
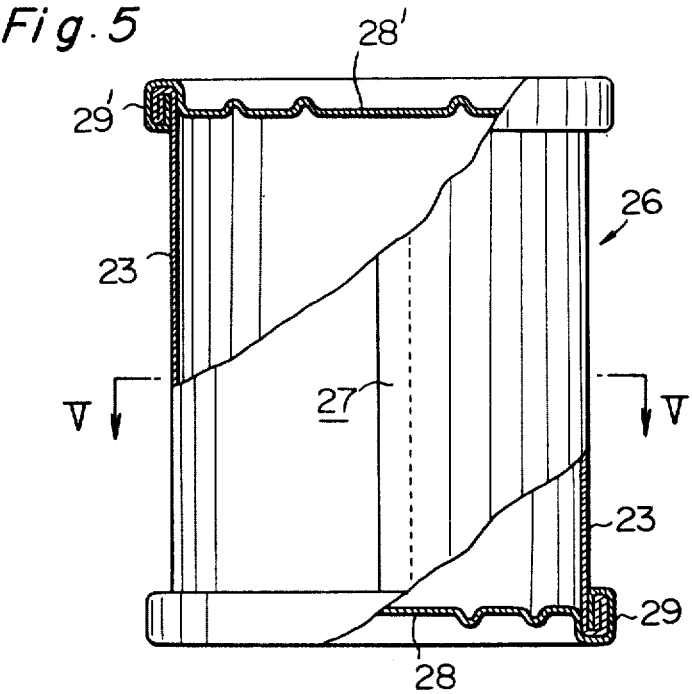
FIGS. 5 is a partially sectional side view illustrating a package of food according to this invention which comprises a packaging container composed of a can body.

In one preferable embodiment of this invention, there is provided a heatable sealed package of food comprising a precooked food product encased in a packaging container, said packaging container composed of two confronting sheet materials, sealed portions formed at the ends of said sheet materials and a cavity for encasing the food product therein which is formed between said two sheet materials, at least one sheet material that has a contact with the encased food product consisting of a metal sheet having at least on the inner surface thereof a protective layer of a heat resistant resin selected from the group consisting of polyimide resins and polyimidazole resins, and said sheet materials being bonded at the sealed end portions by an adhesive which is in contact with the protective layer of said heat resistant resin.

For instance, said packaging container may be constructed of a container proper composed of a semi-hard or hard sheet material having a food-encasing portion and a flange member surrounding the periphery of the food-encasing portion, and a lid member composed of a sheet material covering the container proper. This semi-hard or hard sheet material consists of a metal sheet having a thickness of $10\ \mu$ to $500\ \mu$ and a protective coating layer formed at least on the inner surface of the metal sheet, said protective coating layer having a thickness of $1\ \mu$ to $10\ \mu$ and being composed of a polyimide resin or polyimidazole resin. Between the flange member of the container proper and the lid member, a sealed portion is formed by heat sealing of a thermoplastic resin layer of a polyamide or polyester disposed in contact with the protective coating layer of the container proper.

This container proper may take an optional form, as long as it has a flange member for forming the sealing structure between the container proper and the lid member around the periphery of the food-encasing portion of the container proper. For instance, the container proper may optionally take a form of any of vessels having a cavity for encasing a food product, such as dishes, e.g., lunch dish, roasting dish, cake dish, etc., pans and pots, e.g., frying-pan, sukiyaki-pan, stew-pan, cooking pot, etc., cups, lunch-boxes, and other tablewares. The container proper may be formed by press-molding a metal plate or molding it by other means. On the inner surface or both surfaces the container proper has a protective coating layer of a polyimide or polyimidazole resin. The lid member may take optional form and structure as far as the opening portion of the container proper can be completely covered by the lid member. As the lid member, there may be employed a metal foil, a metal plate, a laminate of a resin and a metal foil or plate, and a resin laminate. The container proper and lid member are tightly and closely bonded to each other at the periphery of the food-encasing portion of the container proper by heat sealing of the heat resistant resin layer of the container proper and the heat-sealable resin layer which is in contact with said heat resistant resin layer, whereby a sealed portion is formed.

More specifically, as illustrated in FIG. 1, container proper 1 has a coated structure consisting of metal plate 2 and protective layers 3 and 3' of a polyimide or polyimidazole resin formed on both the surfaces of metal plate 2, and the container proper is provided with food-encasing portion 4 formed by press molding and sealed end portion 5 positioned around the periphery of food-encasing portion 4. Lid member 6 is constructed of metal plate or metal foil 7 (or laminate of a metal plate or foil and a resin) and heat-sealable resin layer 8 applied uniformly throughout the inner surface of said plate-like member 7. After a food product has been packed into food-encasing portion 4 of container proper 1, lid member 6 is placed thereon so that it covers completely the opening part and end portion 5 of container proper 1. Then, the end portion 5 of container proper 1 and the lid member placed thereon are heated under pressure thereby to heat seal protective layer 3 of a polyimide resin or polyimidazole resin and heat-sealable resin layer 8, whereby sealed portion 9 is formed.

In FIG. 1, a polyimide or polyimidazole resin layers 3 and 3' are formed on both surfaces of metal plate 2. However, it is also possible to form a protective layer 3 of a polyimide or polyimidazole resin only on the inner surface of metal plate 2 as illustrated in FIG. 2. In the embodiment illustrated in FIG. 1, the heat-sealable resin layer 8 is applied throughout the inner surface of the lid member 7. However, it is also possible to apply a heat-sealable layer 8' only the part of lid member 7 corresponding with the end portion 5 of container proper 1, as illustrated in FIG. 2. It is also possible to form a layer of an adhesive comprising thermostatable resin instead of the heat-sealable resin layer 8.

In the above preferable embodiment of this invention, the packaging container can be a bag or pouch consisting of two flexible sheet materials sealed together at their end portions. This flexible sheet material consisting of a metal foil having a thickness of 5 $\mu$ to 500 $\mu$ and protective coating layers of a polyimidazole resin formed on both surfaces of said metal foils, and the sealed end portion of the bag is formed by heat fusion of a layer of a thermoplastic resin such as a polyamide resin or a polyester resin.

For instance, as illustrated in FIG. 3-A and 4-A, the flexible sheet material which is designated as a whole by 11 consists of metal foil 12 and protective coating layer 13 and 13' of a polyimide resin or polyimidazole resin applied on both surfaces of metal foil 12. These two flexible sheet materials 11 and 11' are sealed together at their ends 14, and a cavity 15 for encasing a food product therein is formed between confronting flexible sheets 11 and 11' sealed together at their ends. Of couse, instead of formation of a bag by piling two sheets and sealing them, it is possible to form a similar bag by folding one sheet material and sealing side ends thereof. In the packaging container of this bag type, sealed end portion 14 is formed by heat fusion of heat-sealable resin layers 16 and 16 contacting protecting coating layers 13 and 13' of the flexible sheet materials. The sealing of this sealed end portion 14 may be accomplished by employing an adhesive of a thermosetting resin instead of heat fusion of heat-sealable resin layers 16 and 16. In order to facilitate the opening operation of the packaging container of this bag type, it is possible to form notches 17 and 17' on the side end of one of sealed ends 14 at a little lower position.

Although the sealed end portion 14 is formed by heat fusion of heat-sealable resin layers 16 and 16 in the baglike container illustrated in FIG. 3-A and 4-A, it is possible to form sealed end portion 14 by bonding side ends of flexible sheet materials 11 and 11' by an adhesive 16' composed of a thermosetting resin, as illustrated in FIG. 3-B and 4-B. In this case, an opening 18 is provided for packing a food product at the upper part of one of flexible sheet materials 11, and through this opening 18 the food product is encased in food-encasing void 15. Then sealing flexible sheet 19 consisting of a metal foil having on one surface a protective coating layer 13'' of a polyimide or polyimidazole resin or other heat resistant resin such as polyester and having on the other surface a heat-sealable resin layer 16 is applied so as to cover completely said opening 18, and said heat-sealable resin layer 16 of said sealing flexible sheet 19 is melt-bonded to the surface of flexible sheet 11, whereby the heat sealing is accomplished.

In another preferable embodiment of this invention, there is provided a heatable sealed package of food comprising a precooked food product encased in a packaging container, said packaging container consisting of a can body comprising a tube-like can shell provided with flange members on the opposite ends thereof, can end members, and seamed portions formed between each flange member of the can shell and the respective can end member, said can shell being formed by lapping both edges of a plate-like metal blank and lap-bonding them by heat fusion of a thermoplastic resin interposed between the confronting surfaces of both side ends of the metal blank, said plate-like metal blank having at least on the surface constituting the inner surface of the can shell a protective coating layer of a polyimide resin or polyimidazole resin, and said confronting surfaces of the side edges of the plate-like metal blank being lap-seamed by heat fusion of a layer of a thermoplastic resin such as a polyamide or polyester resin which is disposed in contact with said protective coating layer.

This embodiment will now be illustrated by reference to FIGS. 5 and 6. Metal blank 23 consisting of plate-like metal sheet 21 and protective coating layers 22 and 22' formed on one surface (inner surface when molded to the can body) or both surfaces of metal sheet 21 is molded into a cylinder or other tube-like form, and both side edges 24 and 24' of the metal blank is lapped and bonded to form a side-lap-seam. Layer 25 of an adhesive of a thermoplastic resin such as polyamide or polyester is provided between confronting side edges 24 and 24' of metal blank 23, and side-lap-seam 27 of can shell 26 is formed by this adhesive layer. Can end member 28 is lidded on the lower side end of can shell 26, and double-seam portion 29 is formed between the flange member of can shell 26 and the side end of can end member 28. After a food product has been packed into such can body, deaeration is effected according to need and can end member 28' is lidded on the upper side end of can shell 26. Thus, double-seam portion 29' is similarly formed between the flange member of can shell 26 and can end member 28'. Thus, a canned food is obtained.

In this invention, it is very important that polyimide resins and polyimidazole resins are especially selected among various resins and they are used for forming a protective coating layer at least on the inner surface of the metal plate constituting the packaging container. It has been well known that polyimide resins are excellent in heat resistance, but influences of polyimide resins on food products caused when food products are allowed to have a contact with polyimide resins for a long period of time, especially at high temperatures, have not been known in the art. Further, there has been no anticipation that a polyimide resin would be usable as a material for a sealed container for preserving food. As a result of my research works I have found the following heretofore unknown facts:

1. Polyimide resins and polyimidazole resins have not only excellent heat resistance but also such a desirable property that when they are heated directly by fire at such high temperatures as 400° to 500°C. in the state contacted with a food product, they impart no nasty taste or smell to the food product.

1. Polyimides consisting of the recurring units expressed by the following formula

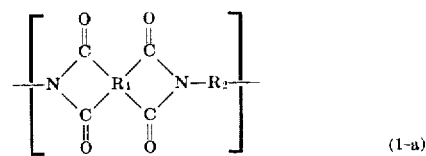

(1-a)

or

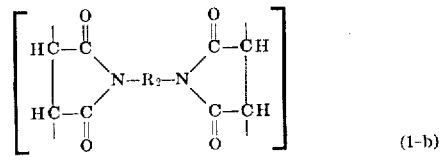

(1-b)

wherein $R_1$ is a tetra-valent group selected from the group consisting of aromatic, aliphatic, alicyclic and aromatic-aliphatic tetra-valent groups and their substituted products; and $R_2$ is a di-valent group selected from the group consisting of aromatic, aliphatic, alicyclic and aromatic-aliphatic di-valent groups and their substituted products.

Instances of polyimides of this type are disclosed in, for example, Japanese Pat. Publication Nos. 10999/61, 26011/64, 7616/65, 5354/67, 629/68, 18790/68 and 2062/69.

2. Polyamideimides consisting of the recurring units expressed by the following formula

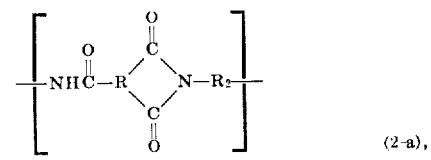

(2-a),

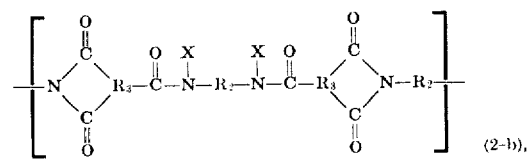

(2-b),

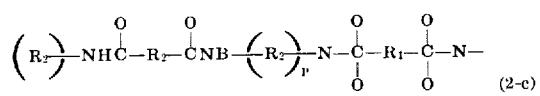

(2-c)

or

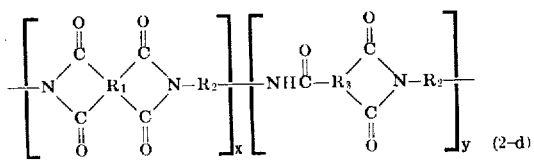

(2-d)

wherein $R_1$ and $R_2$ are as defined above, $R_3$ is a tri-valent group selected from the group consisting of aromatic, aliphatic, alicyclic and aromatic-aliphatic tri-valent groups and their substituted 2. Polyimide resins and polyimidazole resins are very tightly and closely bonded to heat-sealable resins such as nylon under heat sealing conditions, thereby to form sealed structures excellent in peel strength and impact resistance which can endure the retorting treatment sufficiently.

3. Even when allowed to stand still in the state contacted with a food product for a long period of time, polyimide resins and polyimidazole resins do not impart a nasty taste or smell to the food product, nor cause any degradation of the quality of the food product. Further, when they are applied to a metal plate, they can prevent effectively the metal plate from being eluted in the encased food product or from being corroded.

4. As compared with all the resins heretofore used as materials for packaging food products, in polyimide resins and polyimidazole resins amounts of substances migrating into encased food are very small and negligible. In other words, these resins are of no extractability.

5. A coating layer of a polyimide or polyimidazole resin applied on a metal blank does not cause scorching or other detrioration at all when a polyamide or polyester resin having a higher softening point is bonded by heat fusion to such coating layer. Therefore, the heat resistance of the bonded portion can be highly improved by use of such polyamide or polyester over conventional side-lap-seam cans or other packaging materials.

6. The bonded structure composed of a coating layer of a polyimide or polyimidazole resin applied on a metal blank and a layer of a polyester or polyamide bonded thereto by heat fusion can readily be processed without causing such troubles as peeling of layers. Therefore, when metal cans are formed from a metal blank comprising such bonded structure of resin layers, the flange treatment, the double-seaming of can lids and other processing operation can be accomplished very easily without any trouble.

Based on the above findings, I have now succeeded in providing a package of food which comprises a protective coating layer composed of a polyimide or polyimidazole resin on the inner surface or both surfaces of a metal plate or foil and which, by dint of said protective layer, can possess not only excellent sealing and food-preserving properties but also such a desired property that it can be heated by a direct contact with fire prior to eating of the encased food product.

In this invention, any of polyimide resins having imide rings in the recurring units constituting the main chain may optionally be used as a resin of such protective coating layer. For instance, in this invention there may be employed any of such resins as polyimides, polyamideimides, polyester imides, polyamideimide esters, polyester amide-imides, polyimide imidazopyrrolones, polyimide imidazopyrrolone-imides, polyester imide imidazopyrrolones, polybenzoxazole imides, polyimide oxadiazoles, polysulfone ether imides, polyimide benzoxazole-imides, organopolysiloxane imides, polyimidazole imides, polyoxazinone imides, polybenzthiazole imides, polybenzimidazole imidazopyrrolone imides, polybenzoxazinone imidazopyrrolone imides, polybenzthiazole imidazopyrrolone imides, polybenzoxazole imidazopyrrolone imides, polyimide ureas and mixtures thereof. Each of these polyimide resins is known in the art. Examples of these polyimide resins are illustrated hereinbelow.

products, p is 0 or 1, X stands for a hydrogen atom or a mono-valent hydrocarbon group, and x and y are numbers taking any optional ratio of x/y, for instance, ranging from 1/99 to 99/1, with the proviso that either of x and y is not 0 (zero).

Instances of polyamideimides of this type are disclosed in, for instance, Japanese Pat. Publication Nos. 9698/64, 7635/67, 636/68, 13229/68, 1553/69, 6068/69 and 8148/70, Belgian Pat. No. 650,979, French Pat. No. 1,450,704 and U.S. Pat. No. 3,182,073.

3. Polyester imides consisting of the recurring units expressed by the following formula

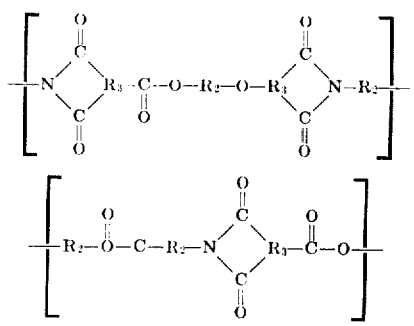

(3-a),

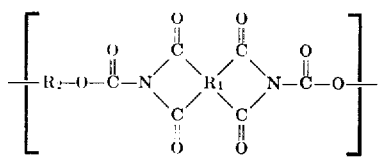

(3-b), or

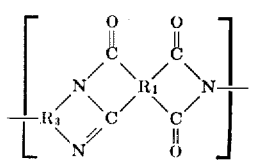

(3-c)

wherein $R_1$, $R_2$ and $R_3$ are as defined above.

Instances of polyester imides of this type are disclosed in, for example, Japanese Pat. Publication No. 21500/63 and J. Poly. Sci. A.I., 1531 (1966).

4. Polyamideimide esters obtained by reacting a diamide-diimide carboxylic acid with a polyhydric alcohol optionally together with an acid ester. Examples of polyamideimide esters of this type are disclosed in, for instance, Japanese Pat. Publication Nos. 13597/70 and 18678/70.

5. Polyester amide-imides obtained by reacting a diimide dicarboxylic acid with a polyester amide. Examples of polyester amide-imides of this type are disclosed in, for instance, Japanese Pat. Publication No. 12621/69.

6. Polyimide imidazopyrrolones consisting of the recurring units expressed by the following formula

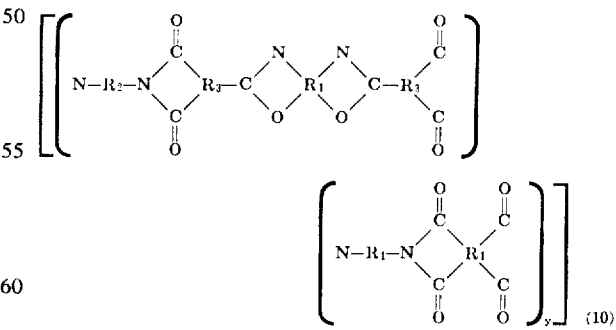

wherein $R_1$ and $R_3$ are as defined above.

Instances of polyimide imidazopyrrolones of this type are disclosed in, for example, Japanese Pat. Publication No. 13515/69.

7. Polyester imide imidazopyrrolones consisting of the recurring units expressed by the following formula

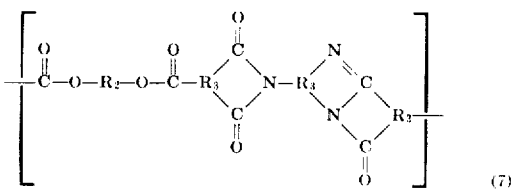

wherein $R_2$ and $R_3$ are as defined above.

Instances of polyester imide imidazopyrrolones of this type are disclosed in, for example, Japanese Pat. Publication No. 1831/70.

8. Polyimide imidazopyrrolone-imides consisting of the recurring units expressed by the following formula

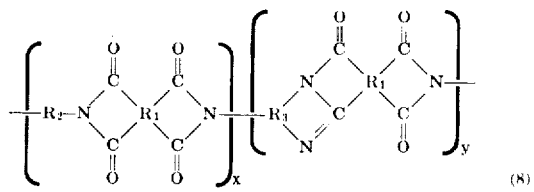

wherein $R_1$, $R_2$, $R_3$, $x$ and $y$ are as defined above.

Examples of polyimide imidazopyrrolone-imides of this type are disclosed in, for instance, Japanese Pat. Publication Nos. 11670/69 and 15672/69.

9. Polybenzoxazole imides consisting of the recurring units expressed by the following formula

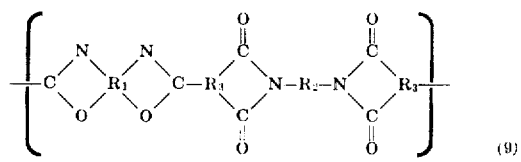

wherein $R_1$, $R_2$ and $R_3$ are as defined above.

Examples of polybenzoxazole imides of this type are disclosed in, for instance, Japanese Pat. Publication No. 24791/70.

10. Polyimide benzoxazole-imides consisting of the recurring units expressed by the following formula wherein $R_1$, $R_2$, $R_3$, $x$ and $y$ are as defined above.

Examples of polyimide benzoxazole-imides of this type are disclosed in, for instance, Japanese Pat. Publication No. 13114/70.

11. Polyimide oxadiazoles consisting of the recurring units expressed by the following formula

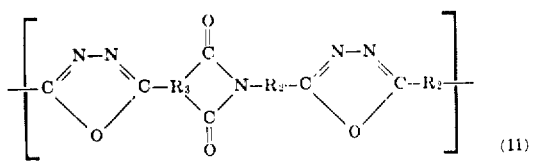

wherein $R_2$ and $R_3$ are as defined above.

Examples polyimide oxadiazoles of this type are disclosed in, for instance, Japanese Pat. Publication No. 2111/71.

12. Polysulfone ether imides consisting of the recurring units expressed by the following general formula

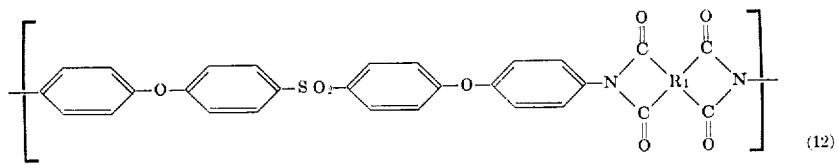

wherein $R_1$ is as defined above.

Examples of polysulfone ether imides of this type are disclosed in, for instance, Japanese Pat. Publication No. 9393/70.

13. Organopolysiloxane imides consisting of the recurring units expressed by the following formula

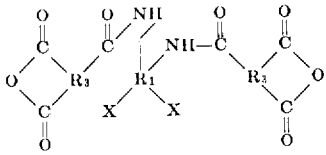

wherein $R_1$ and $R_2$ are as defined above, $R_4$ is a mono-valent hydrocarbon group such as methyl and phenyl groups, and m is a number of at least 1.

Examples of organopolysiloxane imides of this type are disclosed in, for instance, Japanese Pat. Publication No. 27439/68.

14. Polyimidazole imides consisting of the recurring units expressed by the general formula

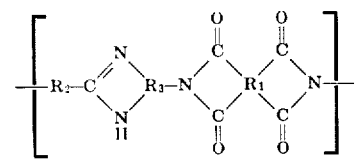

or

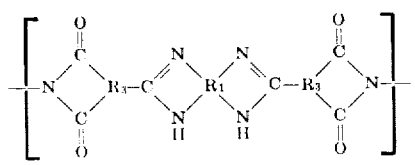

wherein $R_1$, $R_2$ and $R_3$ are as defined above.

Examples of polyimidazole imides of this type are disclosed in, for instance, Japanese Pat. Publication Nos. 19875/69 and 28712/69.

15. Polyoxazinone imides or polythiazole imides consisting of the recurring units expressed by the following formula

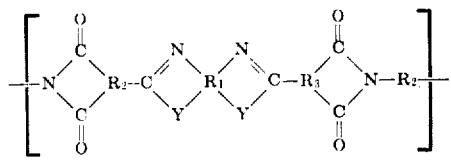

wherein $R_1$, $R_2$ and $R_3$ are as defined above, and Y stands for a —S— or

group.

Examples of polymers of this type are disclosed in, for instance, Japanese Pat. Publication No. 7714/71.

16. Polybenzoxazinone imidazopyrrolone imides, polybenzimidazole imidazopyrrolone imides, polybenzthiazole imidazopyrrolone imides and polybenzoxazole imidazopyrrolone imides, obtained by reacting a compound expressed by the following formula (16)

wherein $R_1$ and $R_3$ are as defined above, and X is a —COOR, —NHR, —SR or —OR group in which R stands for a hydrogen atom or an alkyl group of up to 4 carbon atoms,
with a tetracarboxylic anhydride, a diamine and a triamine.

Examples of polymers of this type are disclosed in, for instance, Japanese Pat. Publication No. 9264/71.

17. Polyimide ureas consisting of the recurring units expressed by the following formula

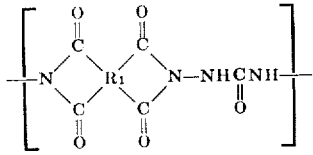

wherein $R_1$ is as defined above.

It is preferred that in polyimides consisting of the recurring units expressed by the above formulae $R_1$, $R_2$ and $R_3$ stand for an aromatic hydrocarbon group having 6 to 15 carbon atoms, such as benzene and naphthalene rings and diphenyl, diphenyl alkane and diphenyl ether groups.

In this invention, as the polyimidazole resin there may be employed, for example, polyimidazoles consisting of the recurring units expressed by the following formula

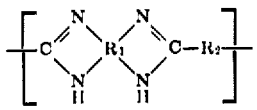
(18)

wherein $R_1$ and $R_2$ are as defined above.

Most preferable heat resistant resins to be used in this invention are polyimide imidazopyrrolone-imides. For instance, polyimide imidazopyrrolone-imides consisting of the recurring units expressed by above formula (8) in which the $x/y$ ratio is from 1/9 to 9/1 are preferably used in this invention. These polyimide imidazopyrrolone-imides are excellent in the heat resistance and the flavor-retaining property and exhibit a good bondability to heat-sealable resins such as polyamides and polyesters. Accordingly, these polymers can give sealed packages having a most desirable combination of an excellent sealing property and an excellent heatability by a direct contact with fire.

Heat resistant resins which are preferred in view of the bondability to heat-sealable resins are, for instance, polyamideimides, polyamideimide esters, polyester imides, polybenzimidazoles and polybenzimidazole imides.

In this invention it is preferred that (A) a polyimide imidazopyrrolone-imide and (B) a polyamideimide or polyamideimide ester are used at a mixing weight ratio of (A) : (B) ranging from 1 : 0.06 to 1 : 25, especially from 1 : 0.145 to 1 : 1.30. The polyimide imidazopyrrolidone-imide (A) is especially excellent in the heat resistance and the flavor-retaining property but when heated at a high temperature, e.g., 100° to 140°C., for a long time, e.g., 10 hours, in the state contaced with saline water, the protective coating of the polyimide imidazopyrrolone-imide (A) is sometimes swollen or eluted. Such tendency is negligible at an ordinary retorting treatment or heating treatment before eating. However, in case encased food is a liquid food containing common salt, it is desired to prevent completely occurrence of such swelling or elution.

It has been found that in this invention, in order to form a strong and tight bonded structure between the polyimide resin protective layer and the metal substrate, the degree of the ring closure in the precursor polymer of the polyimide resin is a very important factor. For instance, the polyimide resin is formed by applying a precursor polymer to the metal substrate and baking it thereby to convert the following recurring unit (A)

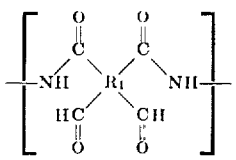
(A)

to the imide ring unit (B)

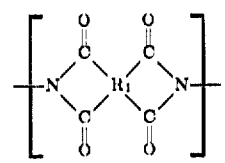
(B)

wherein $R_1$ is as defined above.

In this invention, in order to maintain the peel strength of the bonded portion of the resulting packaging container at a high level and to prevent the peeling of the coated resin from the metal, it is preferred that the ratio of conversion of imide-ring-forming functional groups to imide rings (ring closure ratio), namely the mole ratio expressed by the following formula $$\frac{\text{Moles of recurring units B}}{\text{Moles of recurring units (A+B)}}$$

is within a range of from 50 to 95 percent, especially 60 to 90 percent.

In case the ring closure ratio of the polyimide resin is less than 50 percent, the peel strength of the bonded portion of the packaging container is insufficient and the bonded portion is not satisfactory in thermal and chemical resistances. On the other hand, when the ring closure ratio exceeds 95 percent, the peel strength of the bonded portion of the packaging container is maintained at a considerably high level, but a tendency of occurrence of exfoliation of the resin coating from the metal substrate becomes high. Thus, either too high a ring closure ratio or too low a ring closure ratio is not preferred in view of attainment of protection of encased food.

The ring closure ratio (%) can be obtained by measuring the intensity of absorption at 1776 $cm^{-1}$ owing to the imide ring and the intensity of absorption at 1500 $cm^{-1}$ for correction of the polymer thickness in the infrared absorption spectrum of the sheet provided with a polyimide resin protective coating, which was determined according to the surface reflecting method, and effecting the calculation based on the obtained values of absorption intensities according to the following equation:

ring closure ratio (%) = 100 × $A/B$ wherein A stands for the value expressed by the formula $(\log I/Io)_{1776\ cm^{-1}} / (\log I/Io)_{1500\ cm^{-1}}$ obtained with respect to the sample to be tested, and B stands for the value expressed by the formula $(\log I/Io)_{1776\ cm^{-1}} / (\log I/Io)_{1500\ cm^{-1}}$ obtained with respect to the sample obtained by heating the sample to be tested until increase of the imide ring was not detected any more, and I stands for the percent transmission of the resin at the indicated wavelength and Io stands for the percent transmission of the background at the same wavelength.

I have found that when a resin composition formed by mixing such polyimide imidazopyrrolone-imide with a polyamideimide or polyamideimide ester at the above-mentioned weight ratio is used as the resin of the protective coating layer, the resistance against hot saline water can be highly improved. More specifically, the protective coating layer composed of the above resin composition is not substantially swollen or eluted even when it is heated at 100° – 140°C. for 10 hours in saline water. Further, the bondability of this protective coating layer to a metal or a heat-sealable resin layer is comparable to that of a protective coating layer composed of the polyimide imidazopyrrolone-imide alone, and its heat resistance is superior to that of a protective coating layer composed of a polyamideimide or polyamideimide ester alone.

Polyimide and polyimidazole resins to be used in this invention may comprise modifier resins such as epoxy resins, polyurethane resins, etc., as far as inherent properties of the polyimide or polyimidazole resin are not lost. In case amounts of such modifier resins exceed 20 percent by weight, the above-mentioned characteristic properties (1) to (6) of the polyimide and polyimidazole resins become lost in proportion to increase of said amounts. Therefore, it is generally preferred that amounts of such modifying resins are limited below 20 percent by weight.

The polyimide or polyimidazole resin is generally coated on the inner surface or both surfaces of a metal plate or foil to form a protective coating layer having a thickness of 1 $\mu$ to 100 $\mu$, preferably 1 $\mu$ to 10 $\mu$. In case the thickness of the protective coating layer is less than 1 $\mu$, the intended effects of the polyimide or polyimidazole resin as the protective coating layer cannot be attained. In case the thickness exceeds 100 $\mu$, any particular advantage cannot be attained by such great thickness and provision of a protective coating having such a great thickness is economically disadvantageous.

As the metal substrate on which a protective coating of a heat resistant resin is formed, there may be mentioned steel plates or foils such as so-called black plates, aluminum plates or foils, steel plates on the surface of which a metal such as zinc, tin, chromium or aluminum is plated, and steel plates, the surface of which is chemically or electrolytically treated with phosphoric acid, chromic acid or the like. In general, such metal substrate has a thickness ranging from 5 $\mu$ to 500 $\mu$. A preferable thickness of the metal substrate is generally determined depending on the kind of the intended packaging container. For instance, in the case of a semi-hard or hard molded container provided with a flange member or a can body container, it is sufficient that the metal substrate has a thickness enough to impart the form-retaining property to the metal. In general, it is preferred that the metal substrate has a thickness ranging from 50 $\mu$ to 500 $\mu$. Therefore, in this embodiment of this invention, a metal plate of a thinner thickness, such as a so-called metal foil, may be used as long as it has the form-retaining property. In the case of a metal foil whose thickness is not enough to impart the form-retaining property to the metal foil, it is possible to use such this metal foil in the form of a sandwiched laminate structure formed by employing as an interposing layer a thermoplastic resin such as polyolefin, polyamide or polyester, or a thermosetting resin such as an epoxy resin, an unsaturated polyester resin or a melamine resin. In this invention, the metal plate includes all of the above-mentioned metal materials. Epecially preferable metal plates in the above-mentioned types of the packaging container are aluminum foils and plates, black plates and chromium-treated steel plates having a chromium oxide film in an amount, reckoned as metallic chromium, of 50 to 1,500 $\mu g/dm^2$.

In another embodiment of this invention, namely in a packaging container constructed of a bag of flexible sheet materials, it is preferred that the metal plate is an aluminum foil having a thickness of 5 $\mu$ to 100 $\mu$.

Formation of a protective coating layer of a polyimide resin or polyimidazole resin on the surface of such metal material may be accomplished according to customary procedures. For instance, a precursor polymer of the above-mentioned polyimide or polyimidazole resin, such as polyamide acids, polyamide amines, polyamide acid esters, polyamide imides, polyiminolactones, and imide ring-containing polyamideimides and polyester imides formed by polymerization of a diamideimide dicarboxylic acid or diimide dicarboxylic acid with a polyhydric alcohol and a poly-valent amine, is dissolved in an organic solvent, for instance, N,N-dimethylamides such as dimethylformamide and dimethylacetamide, cyclic ethers such as tetrahydrofuran and dioxane, dimethylsulfoxide, aromatic hydrocarbons such as benzene, xylene and toluene, ketones such as methylethylketone, N-methyl-2-pyrrolidone, phenol, cresol, etc., to form a coating varnish and the so formed varnish is coated on the cleaned surface of a metal plate and baked at a temperature of, for instance, 200° –400°C., whereby a protective coating layer of a polyimide or polyimidazole resin is formed on the surface of the metal plate. The precursor polymer of the polyimide or polyimidazole resin may be applied in the form of powder or the like instead of application in the solution form, and in this case the coating is effected by the fluidized bed coating method, the electrostatic-fluidized bed coating method, the electrolytic coating method or the like. It is also possible to apply the precursor polymer or ring-closed polymer in the form of a film directly on the metal plate.

The objects of this invention can be sufficiently attained even when a protective layer of the polyimide or polyimidazole resin is applied only on the inner surface of the metal plate. In some cases, however, it is desired that a protective coating layer of the polyimide or polyimidazole resin is formed on either of both surfaces of the metal plate. The polyimide or polyimidazole resin layer acts as a protective coating highly resistant against the corrosive action imposed on the outer surface of the container. Further, the polyimide or polyimidazole resin layer is electrically insulating and can prevent occurrence of short circuits which are likely caused during heating by an electric range or the like. Still further, the polyimide or polyimidazole resin is generally colored in yellow to brown, and therefore, it is superior to the metal mat material in heat-absorbing property. Thus, heating of an encased food product before eating can be accomplished for a shorter period.

In the packaging containers illustrated in FIGS. 1 and 2, the metal plate is molded into a packaging container of an optional form having a food-encasing void by optional means known in the art, for instance, by press molding. Since a coated structure consisting of a metal plate and a protective layer of a polyimide or polyimidazole resin formed thereon can be molded and processed into a container of an optional form, namely it has excellent moldability and processability, when such coated structure is formed in advance and it is press-molded into a container of a desired form, it is possible to obtain easily a container proper provided with a protective layer substantially free of pin holes or coating unevenness. Of course, in this invention, it is also possible to mold a metal plate into a container of an optional form and then form a protective layer of the polyimide or polyimidazole resin on the molded metal by such coating means as mentioned above.

In the packaging containers illustrated in FIGS. 1 and 2, a material excellent in resistance against gas permeation and endurable to the retorting treatment is used as the lid member. As mentioned hereinabove, any of metal foils and plates, laminates of metal foils or plates with resins, and laminates consisting of a plurality of resins, can be used as such material. As the metal foil or plate there may be mentioned plates and foils of aluminum, steel plates, steel plates on the surface of which a metal such as zinc, chromium, tin or aluminum is plated, and steel plates, the surface of which is chemically or electrolytically treated with chromic acid, phosphoric acid or the like. These metal plates and foils may have a protective coating on the surface thereof. As a laminate of a metal foil or plate with a resin, there are employed those formed by laminating a polymer film on either one or both surfaces of a foil or plate of such metal as aluminum. In this case, as the film-constituting polymer, there may optionally be used any of the following polymers, namely polyolefins such as polyethylene and polypropylene; polyesters such as polyethylene terephthalate; nylons such as polycaprolactam, polyhexamethylene adipamide, polyhexamethylene sebacamide, polylauryl lactam and polyaminoundecanoic acid; and saponified products of ethylene-vinyl acetate copolymers, etc. As a laminate composed of two or more of resins, there may be used, for instance, products formed by laminating a resin having a low oxygen permeability, such as polyvinylidene chloride resins, saponified vinyl-acetate copolymers and polyvinyl alcohols, with a resin having a low water vapor permeability, such as polyolefins, polyvinylidene chloride resins and fluorine resins. Each of these materials constituting the lid member is known in the art, and suitable materials are chosen depending on the form of the container, the kind of the food to be encased and other factors. A most preferable material for the lid member in this invention includes an aluminum foil or plate, an electrolytically treated chromium steel plate, a tin-deposited steel plate, a black plate and an assembly of such metal foil or plate and a layer of such resin as mentioned above, coated or laminated thereon.

In the packaging containers illustrated in FIGS. 1 and 2, it is preferable that the container proper and lid member are sealed by heat sealing of a heat-sealable resin layer disposed in contact with a polyimide or polyimidazole resin layer of the container proper. As the heat-sealable resin, there are generally used thermoplastic resins having a melting point of at least 150°C., preferably at least 200°C., and having a hot-melt bondability. In this invention it has been found that such resins as, for instance, nylons, polyesters, polysulfones, polycarbonates and polyphenylene oxide copolymers have excellent heat-sealing property to the polyimide or polyimidazole resin layer. Examples of these resins will now be illustrated.

a. Polyamides consisting of the recurring units expressed by the following formula

or

wherein R is an aliphatic hydrocarbon group having at least 3 carbon atoms, preferably 5 to 12 carbon atoms, $R^1$ is an aliphatic hydrocarbon group having at least 2 carbon atoms, preferably 4 to 11 carbon atoms, and $R^2$ is an aliphatic hydrocarbon group having at least 4 carbon atoms, preferably 4 to 11 carbon atoms.

Specific examples of polyamides of this type are nylon 6 ( polycapramide ), nylon 7 ( poly-ω-aminoheptanoic acid ), nylon 8 ( poly-ω-aminocaprylic acid ), nylon 9 (poly-ω-aminopelargonic acid ), nylon 10 ( poly-ω-aminodecanoic acid ), nylon 11 ( poly-ω-aminoundecanoic acid ), nylon 12 ( poly-ω-aminododecanoic acid ), nylon 13 ( poly-ω-aminotridecanoic acid ), nylon 6—6 (polyhexamethylene adipamide ), nylon 6-10 ( polyhexamethylene sebacamide ), nylon 6-12 ( polyhexamethylene dodecamide ), nylon 10-6 ( polydecamethylene adipamide ), nylon 10—10 ( polydecamethylene sebacamide ), nylon 10-12 ( polydecamethylene dodecamide ), nylon 10-13 ( polydecamethylene tridecamide ), nylon 12-6 ( polydodecamethylene adipamide ), nylon 12-10 ( polydodecamethylene sebacamide ), nylon 13—13 ( polytridecamethylene tridecamide ), and interpolyamides thereof.

b. Polyesters consisting of the recurring units expressed by the formula

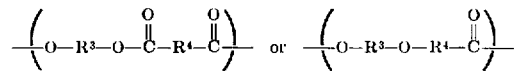

wherein $R^3$ is an alkylene group having 2 to 4 carbon atoms or a cycloalkylene group, and $R^4$ is a phenylene group.

Specific examples of polyesters of this type are polyethylene terephthalate, polytetramethylene terephthalate, polyethylene terephthalate/isophthalate, poly-p-ethylene-oxybenzoate and 1,4-cyclohexylene dimethylene terephthalate/isophthalate copolymer.

c. Polysulfones consisting of the recurring units expressed by the following formula

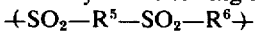

wherein $R^5$ and $R^6$ each stand for an alkylene group having 4 to 15 carbon atoms or a di-valent aromatic group.

Examples of polysulfones of this type are polyhexamethylene sulfone and a polysulfone consisting of the recurring units expressed by the following formula

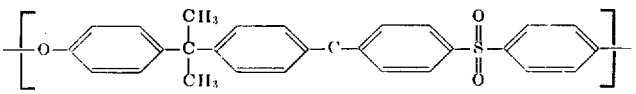

d. Polycarbonates consisting of the recurring units expressed by the following formula

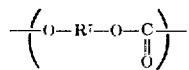

wherein $R^7$ is a hydrocarbon group having 8 to 15 carbon atoms.

Specific examples of polycarbonates of this type are poly-p-xyleneglycol-bis-carbonate, poly-dioxydiphenylmethanecarbonate, poly-dioxydiphenylethane-carbonate, poly-dioxydiphenyl-2,2-propane-carbonate and poly-dioxydiphenyl-1,1-ethane-carbonate.

e. Polyphenyleneoxides such, for example, as polymers consisting of the recurring units expressed by the following formula

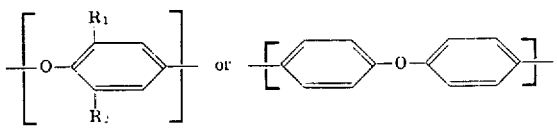

wherein $R_1$ and $R_2$ stand for an alkyl group having 1 to 3 carbon atoms or a hydrogen atom.

In addition to polymers of the above-mentioned types (a) to (e) the following polymers may also be used in this invention.

f. Phenoxy resins such, for example, as polymers consisting of the recurring units expressed by the following formula

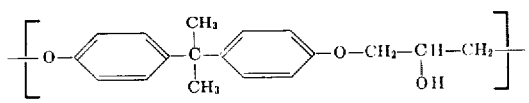

g. Polyamide acids such, for example, as polyamide acids formed by reacting butane-tetracarboxylic acid dianhydride with a diamine (see Japanese Pat. Publication No. 42318/71).

h. Polytetrafluoroethylene-hexapropylene copolymers consisting of the recurring units expressed by the following formula

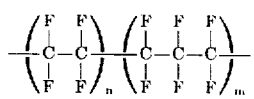

However, in view of the above-mentioned characteristic properties (1) to (6) of the polyimide or polyimidazole resin, use of resins (a) to (e), especially polyamides and polyesters, is desired in this invention.

In general, it is preferable that a layer of such heat-sealable resin has a thickness of 5 $\mu$ to 200 $\mu$, especially 10 $\mu$ to 100 $\mu$. In case the thickness of the heat-sealable resin layer is less than 5 $\mu$, it sometimes happens that it is difficult to effect the heat sealing uniformly all along the periphery of the container proper. Any particular effects cannot be obtained if the thickness of the heat-sealable resin layer is made greater than 200 $\mu$. The heat-sealable resin layer may be formed, for instance, throughout the inner surface of the lid member or only a part of the lid member corresponding with the side end portion, i.e., the flange member, of the container proper. Of course, in case the lid member is composed of a laminated or coated structure provided with a layer of such a heat-sealable resin as explained above, this heat-sealable resin layer can be used for attaining the heat sealing. In order to accomplish the heat sealing promptly and securely in the sealed portion, it is possible to adopt such procedure as comprising forming in advance a layer of a heat sealable layer on the entire face or the peripheral portion of the lid member, also forming a layer of a heat sealable resin on the polyimide or polyimidazole resin layer at the side end portion of the container proper, and melt-bonding under heat both heat-sealable resin layers. It is also possible to accomplish the heat sealing by forming a film of a heat sealable resin in the form of a packing between the peripheral portion of the lid member and the side end portion of the container proper and heating under pressure the peripheral portion of the lid member and the side end portion of the container proper. In short, as far as the lid and container proper are heat-sealed by a heat sealable resin layer having a contact with a polyimide or polyimidazole resin layer of the container proper, the heat sealable resin layer may be disposed in an optional manner. Formation of the heat sealable resin layer on the lid member and/or the side end of the container proper can be accomplished by applying such a heat sealable resin as mentioned above in an optional form such as solution, dispersion (latex), powder, film or the like onto a desired part.

Food-preserving packaging containers of this invention can preserve for a long period of time without any particular preserving treatments such as freezing all the kinds of foodstuffs, especially food products in which heating is preferred prior to eating, such as beef steaks, hamburger steaks, Frankfurt sausages, fried eggs, hams, bacons, roast fishes, sukiyaki, grilled chikens, pizza, pies, stewed beef, curried ffoods, frizzled boiled rice, chow mein, etc. During preservation or heating prior to eating, packaging containers of this invention do not impart a nasty taste or smell to encased food products, or they are not eluted or extracted in encased food products.

After such food product has been packed into the container proper in vacuo or in a nitrogen or steam atmosphere, or packed in air under heating conditions, deaeration is effected by introduction of steam or the like and the lid member is coated on the container proper. Then, the heat sealing is conducted by any of customary means, for instance, the press sealing and bonding method, the dielectric sealing and bonding method, the ultrasonic sealing and bonding method, etc. The heat sealing temperature varies considerably depending on the kind of the heat sealable resin, but in general, it is recommendable to select temperatures at which the heat sealable resin is sticky, within a range of from 150° to 300°C. It is generally preferred that the heat sealing is conducted under a pressure of from 1 to 100 Kg/cm². After the heat sealing operation, the resulting heat-sealed portion is cooled under a pressure of, for instance, 1 to 100 Kg/cm², whereby the resin of the heated-sealed portion is solidified and a tight sealed structure is formed.

In packages illustrated in FIGS. 3 and 4, any of the above-mentioned heat sealable resins (a) to (e), especially polyamides (a) and polyesters (b), is applied to a flexible sheet material composed of a metal foil on which is formed a protective coating layer of a polyimide eor polyimidazole resin such as mentioned above. In order to manifest the above-mentioned characteristics (1) to (6) required of food packages, it is important to apply the heat sealable resin only to the inner surface of the flexible sheet material at the part where the heat sealing is effected. The heat sealable resin is applied to the side end to be heat-sealed of the flexible sheet material in the form of, for instance, a film ( a part corresponding with the food-encasing portion is cut away ), a tape, a powder, a solution, a dispersion or the like. The heat sealable may be applied to either one or both of two sheet materials to be lapped. It is preferred that the heat sealable resin is applied to both of the sheet materials.

Flexible sheet materials to which a layer of such a heat sealable resin as mentioned above has been applied are fed in the form of a continuous ribbon or tape to a known automatic bag-forming and packaging apparatus, whereby packaging of food products and sealing operation are accomplished. For instance, two flexible sheet materials are heat-sealed at both side end portions and the lower side end portion to form a bag having an opening at the upper side end portion, from which a food to be encased is packaged. Then deaeration is effected according to need, and the upper end portion is heat-sealed to obtain a sealed package. Alternately, it is possible to adopt such a procedure as comprising placing a food to be encased, especially a solid food of no flowability, between two flexible sheet materials and then heat-sealing the two sheet materials at the peripheral portion surrounding the food-encasing portion.

In the food package of this type, the heat sealing is conducted under the same temperature and cold press conditions as mentioned with respect to the above-explained semi-hard or hard molded packaging container provided with a flange member.

Figure 6:
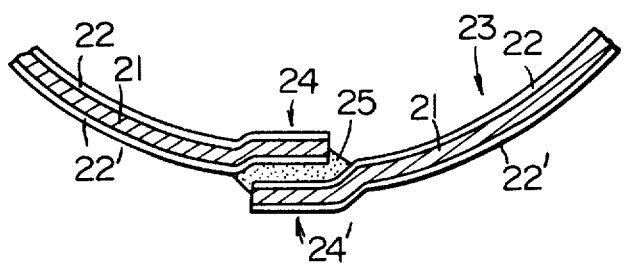
FIGS. 6 and 7 are enlarged sectional views illustrating the lap-bonded portion taken along the line V—V in the package of food illustrated in FIG. 5.
Figure 7:
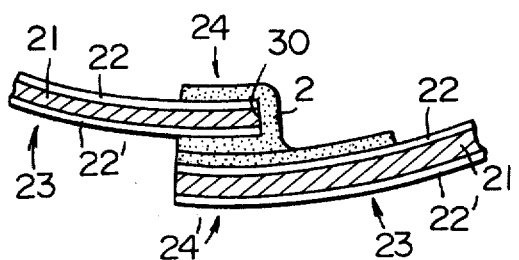

In the case of the can containers illustrated in FIGS. 5 to 7, an adhesive layer of any of the above-mentioned heat sealable resins (a) to (e), especially polyamides (a) and polyesters (b), is applied to the surface to be bonded of a metal on or which a protective coating layer of such a polyimide or polyimidazole resin as mentioned above is formed. Other procedures may be conducted according to known can-manufacturing techniques.

A heat sealable resin such as polyamides or polyesters is applied in an optional form such as film, powder or solution to the part to be bonded of a metal blank so as to form a layer of a desired thickness. The heat sealable resin layer may be formed in advance on either or both of the confronting surfaces of a metal blank to be bonded so that it has a contact with the polyimide or polyimidazole resin layer on the metal blank, or the heat sealable resin layer may be applied between both the surfaces of the metal blank during the bonding operation. In case a can body is side-lap-seamed, the width of the lapped area is, for instance, within a range of from 3 to 10 mm.

A metal blank is molded into a cylindrical form or other tubular form, and both the side edge portions are lapped and bonded. The bonding of the metal blank is carried out at temperatures ranging from a temperature at which a heat sealable resin to be used, for instance, a polyamide or polyester resin, becomes sticky, to a temperature at which it decomposes (such temperature ranges varies considerably depending on the kind of the resin). However, in general, at temperatures between 170° and 350°C. the heat sealable resin is melt-bonded to the metal blank surface through an intermediate layer of a polyimide or polyimidazole resin. Then, the melt-bonded resin layer at the bonded portion is cooled and solidified. Thus, the bonding of the metal blank can be accomplished.

The so formed can shell is subjected to the flange treatment according to a known technique, and then it is double-seamed between the lower can end and the lower flange of the can shell. After a food product to be encased has been packed into the so formed can body, it is double-seamed between the upper can end and the upper flange of the can body, whereby a canned food is obtained. Either a can end composed of the same metal blank as of the can shell, or a can end composed of a metal blank different from that of the can shell may be used in this invention. In each case, it is important that a protective coating layer of such a heat resistant resin as mentioned above is formed on the inner surface of the can end.

In the canned food according to this invention, the bonding of metal blanks can be effected by various bonding methods. For instance, as is illustrated in FIG. 7, coating layers 22 and 22' of a polyimide or polyimidazole resin are formed on both surfaces of a plate-like metal 21. Adhesive layer 25' of a heat sealable resin such as polyamide or polyester is formed on the inner surface of one side end 24' of the so formed can blank 23, namely the side end which will be positioned on the outside part when the lapping is performed, and adhesive layer 25" is formed on the other side end of the can blank, namely the side end which will be positioned on the inside part when the lapping is effected, so that the adhesive layer 25" adheres closely to cut end section 30 of the can blank and covers it completely. Then, the inner and outer adhesive layers 25" and 25' are melt-bonded to each other, thereby to form a side-lap-seam. According to this bonding method, since cut end section 30 of the metal blank is coated completely with the adhesive layer, occurrence of undesired phenomena such as elution of the metal into contents and corrosion of the cut end section of the metal blank can be prevented very effectively.

Sealed food packages of the above-mentioned three types of this invention include various modifications within a range not deviated from the principal technical concept of this invention. For instance, two confronting surfaces of a metal blank can be bonded by means of an adhesive of a thermosetting resin which is known per se, instead of melt-bonding of a heat selable resin such as polyamide or polyester. Epoxy resin adhesives, polyurethane adhesives and the like are preferably used as such adhesive.

In the above sealed food package of this invention, since the sealed portion is bonded by the adhesive layer through a polyimide or polyimidazole resin layer coated on the metal blank surface, the resulting sealed structure is very excellent in mechanical properties such as peel strength and impact resistance. Furthermore, such package can endure sufficiently the retorting treatment conducted at a temperature of 110° to 160°C. and under a pressure of 0.5 to 7 Kg/cm².

Sealed food packages of this invention can be heated by a direct contact with fire, for instance, by means of an oven, a kitchen range, an electric range, a stove, a portable fuel, firewood or the like, prior to eating, if necessary after opening of packages. Thus, encased food products can be heated, boiled, roasted or parched prior to eating. In this case, even when packages of this invention are heated at such high temperatures as 400° to 500°C. by a direct contact with fire, they do not impart a nasty smell or taste such as so-called burning smell or taste.

Figure 8:
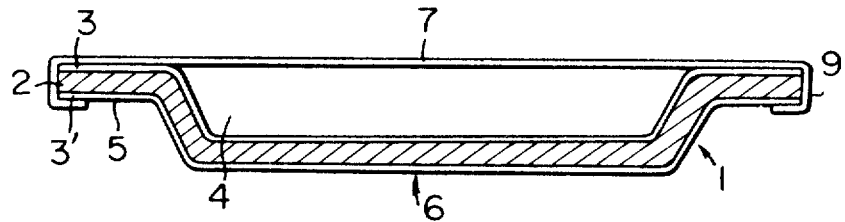
FIG. 8 is a view illustrating the section of another embodiment of a package of food according to this invention.

Food packages of this invention are not only useful for sealing and preserving foodstuffs, but also usable as handy containers for preserving refrigerated food products, which are to be heated prior to eating. For instance, as illustrated in FIG. 8, container proper 1 is press-molded from a sheet composed of metal plate 2, on both surfaces of which protective coating layers 3 and 3' of a polyimide or polyimidazole resin are formed, a refrigerated food product is packed into food-encasing portion 4, lid member 7 is disposed so that it covers the opening of container proper 1 and flange member 5 completely, and the peripheral portion of lid member 7 is folded along the periphery of the flange member thereby to form seamed portion 9. Thus, a food package suitable for the above use can be formed.

In sealed packages of this invention, it is possible to provide a handle so as to facilitate the heating operation or withdrawal of encased food prior to eating, and it also possible to attach an opener in order to facilitate the opening of the package.

This invention will now be illustrated in more details by reference to examples, from which effects and advantages attained by this invention will readily be understood. Needless to say, it must be noted that the scope of this invention is not limited by these examples.

EXAMPLE 1

Flanged Container Provided With Polyimide Imidazopyrrolone-Imide Coating

Polyamide acid amine (having a logarithmic viscosity number of 1.03 as measured in N-methylpyrrolidone at 30°C.) obtained by reacting as monomer components 3,4,4'-triaminodiphenyl ether, 4,4'-diamino-diphenyl ether and pyromellitic dianhydride at a molar ratio of 1 : 1 : 2 was dissolved in dimethylacetamide having a concentration of 12 percent solids. This solution was coated in a thickness of 5 – 6 $\mu$ on both surfaces of a chromium-treated steel plate of a thickness of 170 $\mu$ and a chromium amount of 1,000 $\mu g/dm^2$ (tradename "Hitop" manufactured by Tokyo Kohan Co. Ltd.), and the baking was conducted at 300°C. for 3 minutes to obtain a circular sheet having a diameter of 162 mm. The sheet was press-molded into a container of an inner diameter of 100 mm and a depth of 30 mm provided with a 10 mm width flange (drawing ratio being 1.62). During the press-molding, exfoliation of the resin coating or exposure of the metal surface was not observed. A laminate formed by bonding a 12 $\mu$ thickness film of polyethylene terephthalate having a degree of polymerization of 17,800 and a crystallinity of 52.2 percent, an intermediate layer of aluminum foil of a 9 $\mu$ thickness and a 40 $\mu$ thickness film of a polymer (nylon-12) of $\omega$-aminododecanoic acid having $\eta$rel of 1.80 in 0.5 percent m-cresol solution with an adhesive composed of a mixture of 10 parts of a triisocyanate formed from 3 moles of tolylene diisocyanate and 1 mole of trimethylol propane and 100 parts of a isocyanate-modified, hydroxyl-terminated polyadipate having a viscosity of 30,000 cps as measured as 30 percent solution in ethyl acetate was chosen as a material of a lid member for the above container. A circular sheet of a 120 mm diameter was taken from the laminate material. About 100 g of raw bacon was charged into the press-molded container. The circular sheet of the laminate material was placed on the flange member of the container in a manner such that the $\omega$-aminododecanoic acid polymer portion of the lid material was on the inside of the container, and the heat sealing was conducted at 240°C. under a pressure of 3 Kg/cm$^2$ for 0.5 second. The peel strength between the flange member and the lid was 1,050 g per 20 mm width. The resulting assembly was sterilized by performing the retorting treatment at 140°C. for 2 minutes. Then, the container was allowed to stand still at room temperature. The lid was broken and the container was heated by means of a burner through an asbestos wire. A roasted bacon of a good taste was obtained. No nasty flavor or smell, or no smoke was generated during the heating treatment, and therefore, the bacon was not tinged with any nasty flavor or smell.

EXAMPLE 2

Flanged Container Provided With Polyamide-Imide Ester Resin Coating

A polyamide-imide ester having a logarithmic viscosity number of 0.34 (as mesured in N-methylpyrrolidone at 30°C.) was formed by heating in xylene at 140° – 160°C. for 10 hours a mixture of 0.375 mole of an aromatic acid of a molecular weight of 900 having amide groups and imide rings and being composed of 4,4'-diphenylmethane diisocyanate and trimellitic anhydride at a molar ratio of 2 : 3 as monomer components, 2.0 moles of dimethyl terephthalate, 1.8 moles of glycerine and then heating the mixture at 240°C. for another 5 hours. A 15 percent solution of the polyamide-imide ester in dimethyl acetamide was coated in a thickness of 5 – 6 $\mu$ on both surfaces of the same chromium-treated steel plate as used in Example 1 (tradename " Hitop " manufactured by Toyo Kohan Co. Ltd.), and the baking was carried out at 300°C. for 2 minutes. The steel plate was cut into a disc of a diameter of 216 mm and press-molded into a container of an inner diameter of 120 mm and a depth of 25 mm provided with a flange of a 23 mm width (drawing ratio being 1.8). During the molding procedure, exfoliation of the resin coating or exposure of the metal surface was not observed. A laminate formed by bonding an aluminum foil of a 30 $\mu$ thickness and a film of a 25 $\mu$ thickness composed of the same polyethylene terephthalate as used in Example 1 with the same urethane adhesive as used in Example 1 was cut into a disc of a 166 mm diameter, and it was used as a lid for the container. Beef steak was charged in the container and the lid was placed thereon in a manner such that the polyethylene terephthalate layer was on the inside of the container, following which the heat sealing was effected at 300°C. under a pressure of 20 Kg/cm$^2$ for 1 second. The peel strength of more than 800 g per 20 mm width was attained between the lid member and the flange member of the container. The sterilization was carried out by conducting the retorting treatment at 140°C. for 2 minutes, and then the container was allowed to stand still for one week. The lid was broken, and the container was heated for 10 minutes in an electric oven. Roasted beef steak of a good taste was obtained.

EXAMPLE 3

Polyimidazopyrrolone-Imide Resin/Chromium-Treated Steel Plate Container

A press-molded container was prepared in the same manner as in Example 1. A lid material was prepared by coating the same solution of the polyimide imidazopyrroloneimide precursor as used in Example 1 in a thickness of 2 – 3 $\mu$ on both surfaces of an aluminum foil of a 50 $\mu$ thickness, baking the coated foil at 300°C. for 3 minutes and cutting it into a circular sheet having a diameter of 120 mm. A 20 percent solution of an interpolymer (copolymerized nylon resin) of polycapramide/polyhexamethylene adipamide/polyhexamethylene sebacamide of a ratio of 40/35/25 (having a viscosity of 10 cps as measured as a 10 percent solution in methyl alcohol at 40°C.) in methyl alcohol was coated on the peripheral portion of the circular sheet along the width of 10 mm, and the solvent was removed by drying to obtain a layer having a thickness of about 10 $\mu$. As a lid member, the resulting circular sheet was placed on the flange member of the container in a manner such that the interpolymer layer was contacted with the flange member, following which the heat sealing was accomplished by effecting the heat fusion-bonding at 260°C. under a pressure of 4.5 Kg/cm$^2$ for 0.5 second. The resulting peel strength between the lid and the container was 1700 g per 20 mm width. A roast fish was charged in the container, and the retorting sterilization was carried out at 140°C. for 2 minutes, and the container was allowed to stand still at room temperature for one week. The lid was taken off, and the container was heated for 1 minute in a gas oven. A roast fish of a good taste was obtained.

EXAMPLE 4

Polyime Resin/Steel Plate Container

A 12 percent solution of a polyamide acid (having an inherent viscosity of 1.13 as measured as a 0.5 percent solution in dimethylacetamide at 20°C.) composed of 4,4'-diamino-diphenyl-ether and pyromellitic dianhydride (molar ratio of 1 : 1) as monomer components was coated on both surfaces of a steel plate having a thickness of 230 $\mu$ and baked at 300°C. for 3 minutes to obtain a coating of 4 – 5 $\mu$ on each surface. The coated steel plate was press-molded into a container having the same size and configuration as in Example 1. During the molding procedures, exfoliation of the resin layer was not observed and the appearance of the container was good. A hamburger steak was charged in the container. A lid member prepared in the same manner as in Example 1 was heat-sealed on the container under the same conditions as in Example 1. The sealed container was sterilized by conducting the retorting treatment under pressure at 135°C. for 5 minutes, and it was allowed to stand still at room temperature for one week. Without breakage of the lid member, the container was heated for 5 minutes in an oven toaster. Thus, a heated hamburger steak of a good taste was obtained.

EXAMPLE 5

The same solution of the polyimide resin precursor as used in Example 4 was coated on both surfaces of an aluminum plate having a thickness of 280 $\mu$ and baked at 300°C. for 3 minutes to obtain coatings of 4 – 5 $\mu$ on both surfaces. The resulting aluminum plate was press-molded into a container having the same size and configuration as those of the container press-molded in Example 1. A laminate formed by bonding an aluminum foil having a thickness of 50 $\mu$ and a film of a thickness of 40 $\mu$ composed of a polymer (nylon-11of $\omega$-aminoundecanoic acid having a melting point of 186°C. and an inherent viscosity of 1.39 as measured as a 0.5 percent solution in m-cresol at 20°C. with the same urethane adhesive as used in Example 1 was used as a lid member. A roast chicken was charged in the container, and the above lid member was placed on the container in a manner such that the film of the polymer of $\omega$-amino-undecanoic acid was contacted with the flange member of the container, following which the heat sealing was carried out at 250°C. under a pressure of 3 Kg/cm$^2$ for 0.5 second. Then, the container was subjected to the retorting sterilization at 140°C. for 3 minutes and was allowed to stand still at room temperature for one week. The lid member was taken off and the container was heated for 1 minute in a gas oven, whereby a roast chicken of a good taste was obtained.

EXAMPLE 6

Polyamideimide/Steel Plate Container

A 12 percent solution in dimethylacetamide of a polyamideimide resin synthesized from equimolar amounts of 4,4'-diamino-diphenyl ether and a carboxylic acid containing an imide ring in the molecule and being composed of trimellitic dianhydride and 4,4'-diamino-diphenyl methane at a molar ratio of 2 : 1 as monomer components (said polyamideimide resin having a viscosity of 2000 cps as measured as a 25 percent solution in N-methylpyrrolidone) was coated on both surfaces of a steel plate having a thickness of 230 $\mu$ and baked at 250°C. for 3 minutes to form coatings having a thickness of 4 – 5 $\mu$ on both surfaces of the steel plate. The coated steel was press-molded in a container of the same size and drawing ratio as of the container press-molded in Example 1, during which no crack or exfoliation of the resin coating was observed. A lid member for the above container was prepared by coating the above polyamideimide resin in a thickness of about 2 $\mu$ on one surface of an aluminum foil having a thickness of 50 $\mu$, baking the coating at 250°C. for 3 minutes, laminating a film of a thickness of 40 $\mu$ composed of the same nylon-12 resin as used in Example 1 on the other surface of the aluminum foil with use of the same urethane adhesive as used in Example 1, and cutting the foil to have the same size as the outer diameter of the container. Pre-cooked sukiyaki was charged into the container, and the lid member was placed thereon in a manner such that the nylon-12 film was on the inside of the container, following which the heat sealing was carried out at 250°C. under a pressure of 3 Kg/cm$^2$ for 0.5 second and the retorting sterilization was effected at 140°C. for 3 minutes. Then, the container was preserved for one week at room temperature. Prior to eating, the lid was taken off and the container was heated for 1 minute on a gas oven to obtain sukiyaki of a good taste.

EXAMPLE 7

The same polyimide resin precursor solution as used in Example 4 was coated in a thickness of about 5 $\mu$ on both surfaces of a steel plate press-molded to have the same size and configuration as those of the container press-molded in Example 1, and the baking was carried out at 300°C. for 5 minutes. A lid member was prepared by laminating a 12-μ thick film of the same polyethylene terephthalate as used in Example 1, a 9-μ thick aluminum foil and a 40-μ thick film of the same nylon-12 as used in Example 1 with use of the same urethane adhesive as used in Example 1, and cutting the laminate to have the same size as the diameter of the container. A frankfurt sausage was charged into the container proper, and the nylon-12 film layer and the flange member of the container proper were heat-sealed at a temperature of 250°C. under a pressure of 3 Kg/cm² for 0.5 second. The sealed container was subjected to the retorting sterilization at 120°C. for 30 minutes, and was allowed to stand still at room temperature for 2 weeks. The lid was opened and the container was heated for 3 minutes in an oven toaster. Thus, a roasted frankfurt sausage of a good taste was obtained.

EXAMPLE 8

The same polyamideimide resin solution as used in Example 6 was coated on both surfaces of a steel plate having a thickness of 230 μ and baked at 300°C for 3 minutes. The thickness of the resulting resin coating was about 4 – 5 μ. The press-molding was conducted in the same manner as in Example 1 to obotain a draw-molded container. A beef steak was charged in the container, and a lid formed by laminating a 25-μ thick film of the same polyethylene terephthalate was used in Example 1 and a 40 μ-thick film of the same nylon-12 as used in Example 1 with use of the same urethane adhesive as used in Example 1 was placed on the container in a manner such that the nylon-12 film was on the inside of the container, following which the heat sealing was carried out at 230°C. under a pressure of 3 Kg/cm² for 1 second. The container was preserved in the freezer for 1 week. Then, the container was heated for 3 minutes in a gas oven to obtain a beef steak of a good taste.

EXAMPLE 9

Procedures of Example 2 were repeated except that a 50-μ thick film of a polycarbonate having a molecular weight of 28,500 was used instead of the polyethylene terephthalate film of the lid member and the heat sealing was carried out at 220°C. for 1 second under a pressure of 3 Kg/cm². When the resulting container was subjected to the retorting treatment under the same condition as in Example 2, the assembly was tightly bonded and no damage or exfoliation was observed.

COMPARATIVE EXAMPLE 1

An epoxy-phenol paint (formed by mixing an epoxy resin of an epoxy equivalent of 2,400 – 3,000 prepared by condensing 2,2'-bis-(4-hydroxyphenyl)-propane and epichlorohydrin, with a solution of a resol-type phenol resin at a solid weight ratio of 1 : 1 and subjecting the mixture to pre-condensation) was coated in a thickness of 4 – 5 μ on both surfaces of a chromium-treated steel plate, and the baking was carried out at 210°C. for 10 minutes. In the same manner as in Example 1, the coated steel plate was press-molded into a container of the same size and configuration as of the container press-molded in Example 1, and a bacon was charged into the container. A lid member as used in Example 1 was heat-sealed and the retorting sterilization was conducted at 140°C. for 2 minutes. The container was preserved at room temperature, and then was heated on a gas oven. The container was scorched and generation of a smoke and a nasty smell was observed. The bacon was tinged with a nasty smell presumed to be bled from the epoxy resin. Instead of bacon n-heptane was used as an oil-like solvent and the extraction test was conducted at 98°C. The extraction ratio was found to be 0.048 percent based on the amount of the coated resin. In contrast, when the polyimide imidazopyrrolone-imide-coated container obtained in Example 1 was subjected to the same extraction test, the extraction ratio was found to be 0 percent.

COMPARATIVE EXAMPLE 2

A resin solution formed by adding 5 parts of a 50 percent solution of tin octylate in xylene to 100 parts of a 50 percent solution in xylene of an organopolysiloxane having a molecular weight of about 5,000 and containing methyl and phenyl groups at side chains with the phenyl group content of 50 percent was coated on both surfaces of a chromium-treated steel plate having a thickness of 170 μ and baked at 180°C. for 30 minutes to form coatings having a thickness of 5 – 6 μ on both surfaces of the steel plate. As a food to be encased, a frankfurt sausage was charged in a container formed by press-molding the above coated steel plate in the same manner as in Example 1, and a lid member as used in Example 1 was heat-sealed thereon. The sealing property was so bad that when the sealed container was subjected to the retorting sterilization at 140°C. for 2 minutes, a part of the heat-sealed portion was exfoliated and the sealing effect could not be attained. When the lid was opened and the container was heated on a gas oven for 1 minute, generation of a smoke and a nasty smell from the container was observed. When the container was extracted with n-heptane, the extraction ratio was found to be 13.4 percent. In the case of the container coated with the polyamide-imide ester which was prepared in Example 2, the extraction ratio was found to be only 0.014 percent.

EXAMPLE 10

The same polyamide-imide ester resin solution as used in Example 2 was coated in a thickness of 5 – 6 μ on both surfaces of a chromium-treated steel plate of a 170 μ thickness containing chromium in an amouont of 1000 μg/dm² (tradename " Hitop " manufactured by Toyo Kohan Co. Ltd.), and baked at 3000°C. for 2 minutes. Then, the steel plate was cut into a body blank having a size of 60 mm ×243 mm. A nylon-12 film having a thickness of 80 μ and a width of 10 mm was heat-bonded to the body blank at 200°C. under a pressure of 2 Kg/cm² for 30 seconds. In a manner as illustrated in FIG. 6, the lap-sealing was conducted to obtain a can shell. The 180° peel strenght of the lap-sealed portion was 4800 g/cm. The flanging was conducted according to a known method, and the bottom end was double-lap-seamed according to a method customarily adopted in manufacture of soldered cans. During either the flanging step or the seaming step, exfoliation of the bonded portion was not caused to occur. When the can was filled with 3 percent saline water and subjected to the retorting sterilization treatment, no exfoliation was observed in the bonded portion, and as is seen from Table 1 given below, no extreme reduction of the bonding strength was observed. Further, during the retorting treatment, bursting of the can was not caused to occur.

After the above can was charged with a beef steak and retorted at 120°C. for 1 hour, the lid was opened and heated in an electric oven. At that time, generation of a nasty smell or flavor from the can was not observed and the encased beef steak was not tinged with any substance migrating from the can. When a solvent was charged in the cam instead of a food product and the extraction test was conducted, as is seen from Table 2, the extraction ratio was very low as compared with the case of a can coated with a conventional epoxy-phenol paint for cans.

COMPARATIVE EXAMPLE 3

Procedures of Example 10 were repeated except that the same epoxy-phenol paint for cans as used in Comparative Example 1 was used instead of the polyamide-imide ester resin and the baking was effected at 210°C. for 10 minutes. The peel strength of the lap-bonded portion of the resulting can was extremely lowered at high temperatures, as is seen from Table 1, and especially in case the encased food contained common salt, the reduction of the peel strength was extremely conspicuous. Further, when this comparative can was subjected to the extraction test in the same manner as in Example 10, the extraction ratio was extremely high as compared with the case of the can obtained in Example 10.

6 $\mu$ after drying, and the baking was carried out at 300°C. for 3 minutes. The coted aluminum plate was cut into sheets having a size of 10 mm × 100 mm. A nylon-12 film having a thickness of 80 $\mu$ was inserted between 2 of the above aluminum sheets and the sheets were bonded by heat-melting the film at 200°C. for 30 seconds under a pressure of 2 Kg/cm² by means of a hot press. The resulting test specimen was subjected to the tensile test by means of a Tensiron tensile tester. As a result, it was found that the peel strength of the test specimen was 300 g/cm at room temperature, and it was heightened to 1,040 g/cm when measured in a high temperature atmosphere maintained at 160°C.

When the same test was effected on an aluminum plate coated with the same epoxy-phenol resin paint as used in Comparative Example 3, it was found that although the peel strength was 610 g/cm, it was reduced to 550 g/cm in a high temperature atmosphere maintained at 160°C.

EXAMPLE 12

The same polyamide-imide resin precursor solution as used in Example 6 was coated on one surface of an aluminum plate having a thickness of 0.26 mm in such an amount that the coating would have a thickness of 5 – 6 $\mu$ after drying, and then the baking was carried out at 300°C. for 2 minutes. The aluminum plate was cut into sheets having a size of 10 mm × 100 mm. A film of a thickness of 80 $\mu$ composed of the same nylon-11 as used in Example 5 was interposed between Table 1

| | Peel Strength of Lapped Portion (g/cm)[a] | |
|---|---|---|
| | Container of This Invention (Example 10) | Comparative Container (Comparative Example 3) |
| Room Temperature | 4800 | 5600 |
| High Temperature (160°C.) | 5000 | 1800 |
| After Boiling for 7 Hours in 3 % Saline Water at 100°C. | 4800 | 3000 |
| After Boiling for 14 Hours in 3 % Saline Water at 100°C. | 3600 | 1600 |
| After Boiling for 21 Hours in 3 % Saline Water at 100°C. | 3200 | 200 |
| After Retorting Treatment at 120°C. for 1 Hour in the State Filled with 3 % Saline Water | 4200 | 2800 |
| After Retorting Treatment at 140°C. for 1 Hour in the State Filled with 3 % Saline Water | 3600 | 2200 |

[a] The peel strength was measured with use of a Tensiron tensile tester at a stretch rate of 200 mm/min at a stretch angle of 180°.

Table 2

| | Extraction Ratio[b] | |
|---|---|---|
| Extraction Solvent | Container of This Invention (Example 10) | Comparative Container (Comparative Example 3) |
| Water | 0.012 | 0.046 |
| n-Heptane | 0.014 | 0.048 |
| Water/Ethyl Alcohol | 0 | 16.8 |
| Chloroform | 0 | 9.5 |

[b] The test can was charged with the solvent and the solvent was boiled at the boiling point thereof for 5 hours, followed by removal of the solvent by drying and distillation. The amount of the residue was measured and the extraction ratio was expressed in terms of the percentage of the weight of the residue based on the weight of the coated resin.

EXAMPLE 11

The same polyimide resin precursor solution as used in Example 4 was coated on both surfaces of an aluminum plate having a thickness of 0.26 mm in such an amount that the coating would have a thickness of 5 – two of the above aluminum sheets, and the melt-adhesion was effected at 200°C. for 30 seconds under a pressure of 2 Kg/cm² by means of a hot press. Thhe peel strength of the resulting test specimen as measured at room temperature with use of a Tensiron tensile tester was 1540 g/cm. In contrast, the peel strength of a test specimen prepared by employing the same epoxy-phenol resin paint as used in Comparative Example 3 was 940 g/cm.

EXAMPLE 13

The same polyimide-imidazopyrrolone-imide resin precursor solution as used in Example 1 was coated on both surfaces of a black plate having a thickness of 0.23 mm in such an amount that the coating would have a thickness of 5 – 6 μ after drying, and then the baking was carried out at 300°C. for 2 minutes. The coated plate was cut into sheets having a size of 10 mm × 100 mm. A 80 μ-thick film of the same nylon-12 as used in Example 1 was interposed between two of the coated black plate sheets, and the melt-adhesion was conducted at 200°C. for 30 seconds under a pressure of 2 Kg/cm² by means of a hot press. The resulting test specimen was subjected to the tensile test by means of a Tensiron tensile tester. As a result it was found that the peel strength of the test specimen was 5,000 g/cm at room temperature and 2,800 g/cm in a high temperature atmosphere maintained at 160°C. In contrast, when a test specimen prepared by employing the same epoxy-phenol resin paint as used in Comparative Example 3 was subjected to the same test, it was found that the peel strength of the test specimen was 2,800 g/cm at room temperature and 2,000 g/cm in a high temperature atmosphere maintained at 160°C.

EXAMPLE 14

The same polyamide-imide ester resin solution as used in Example 2 was coated on both surfaces of a black plate having a thickness of 0.23 mm in such an amount that the coating would have a thickness of 5 – 10 μ after drying, and the baking was effected at 300°C. for 2 minutes. The coated black plate was cut into sheets having a size of 10 mm × 100 mm, and a 50-μ thick film of the same polyethylene terephthalate as used in Example 1 was interposed between two of the above sheets, following which the melt-adhesion was effected at 280°C. under a pressure of 2 Kg/cm² for 30 seconds by means of a hot press. The resulting test specimen was subjected to the tensile test by employing a Tensiron tensile tester. As a result it was found that the peel strength of the test specimen was 4,200 g/cm. In contrast, when a test specimen prepared by employing the same epoxy-phenol resin paint as used in Comparative Example 3 was subjected to the same procedures as above, it was found that the epoxy-phenol resin layer was deteriorated and colored at the melt-adhesion because of the high temperatue and that the peel strength was only 300 g/cm at the tensile test.

EXAMPLE 15

The same polyamide-imide ester resin precursor solution as used in Example 2 was coated on both surfaces of a black plate having a thickness of 0.23 mm in such an amount that the coating would have a thickness of 5 – 10 μ after drying, and the baking was carried out at 300°C. for 2 minutes. The resulting plate was cut into sheets having a size of 10 mm × 100 mm, and a 100-μ thick film of poly(tetramethylene-terephthalate/isophthalate) was interposed between two of the above sheets, following which the melt-adhesion was effected at 270°C. under a pressure of 2 Kg/cm² for 30 seconds by means of a hot press. The peel strength of the test specimen as measured by means of a Tensiron tensile tester was 1,100 g/cm.

EXAMPLE 16

A 12 percent solution of the same polyimide-imidazopyrroloneimide resin as used in Example 1 in dimethylacetamide was coated on both surfaces of an aluminum foil having a thickness of 30 μ, and the coated aluminum foil was allowed to stand still in an oven maintained at 200°C. for 15 minutes.

The aluminum foil coated with the polyimide imidazopyrrolone-imide resin was cut into a size of 120 mm × 160 mm, and four peripheral side ends of the foil were coated with a 5 percent solution of the same polyamide resin as used in Example 3 in methanol so as to form a resin coating having a thickness of 5 – 10 μ, following which the foil was allowed to stand still at room temperature for 5 minutes.

Another aluminum foil coated with the same polyimide imidazopyrrolone-imide resin and cut into the same size was piled on the above polyamide-coated aluminum foil, and three peripheral sides of the pile foils were heatbonded at 260°C. under a pressure of 2 Kg/cm² for 2 seconds to obtain a packaging bag. The 90° peel strength of the bonded portion was 700 g/20 mm width. A bacon was charged into the bag and the remaining one peripheral side of the bag was heatbonded under the same conditions as above to obtain a heatable packaging container. The container was heated in an electric toaster. Results are shown in Table 3. For comparison, a conventional bag container composed of a polyethylene terephthalate film having a thickness of 12 μ, an aluminum foil having a thickness of 9 μ and a high density polyethylene film having a thickness of 70 μ was heated in an electric toster. Results are also shown in Table 3.

Table 3

| Temperature (°C.) | | Bag of This Invention | | | | Conventional Bag | | | |
|---|---|---|---|---|---|---|---|---|---|
| Temperature of air in toaster | Temperature of bag surface | Nasty smell | Smoke | Melt-adhesion | Surface blackening | Nasty smell | Smoke | Melt-adhesion | Surface blackening |
| 60 | 200 | not observed | not observed | not observed | not observed | faint | not observed | not observed | not observed |
| 90 | 220 | not observed | not observed | not observed | not observed | slight | faint | not observed | not observed partially |
| 110 | 240 | not observed | not observed | not observed | not observed | great | slight | slight | blackened |
| 120 | 250 | not observed | not observed | not observed | not observed | great | great | completely melt-adhered | completely blackened |
| 170 | 130 | | faint | not observed | not observed | not observed | great | great | completely melt-adhered | completely blackened |

EXAMPLE 17

Two aluminum foils having a thickness of 9 μ and an interposing film of a 12 μ thickness composed of the same polyethylene terphthalate as used in Example 1 were laminated by employing the same urethane adhesive as used in Example 1, and two laminate sheets having a size of 130 mm × 170 mm were cut from the resulting laminated product. The same polyimide imidazopyrroloneimide resin as used in Example 1 was coated on both surfaces of each laminate sheet in such an amount that the coating would have a thickness of 2 – 5 μ after drying, and the baking was carried out at 200°C. for 30 minutes and at 300°C. for 10 seconds. As is illustrated in FIG. 3–B, a slit 18 having a length of 105 mm and a width of 1 mm was cut on one of the sheets at a position 30 mm below the upper end and both ends of the slit were formed into a circle having a diameter of 5 mm. The above slit was provided as a food-encasing opening. The sheet provided with the slit and the other sheet were coated at four peripheral side ends with the same urethane adhesive as used in Example 1 and they were bonded together, following which the curing was carried out at b50°C. for 3 days to obtain a bag having a food-encasing opening. The peel strength of the bonded portion of the bag was 1,200 g per 20 mm width. Two pieces of raw bacon were put into the bag from the opening.

Separately, a laminated product (heat-sealable) was prepared by bonding a 12-μ thick film of the same polyethylene terephthalate as used in Example 1, an interposing aluminum foil having a thickness of 9 μ and a 40-μ thick film of the same nylon-12 as used in Example 1 with use of the same urethane adhesive as used in Example 1 was cut into strips having a size of 15 mm× 120 mm. The resulting tape strip was covered on the opening of the bag so that the nylon-12 film layer of the tape strip was contacted with the polyimide imidazopyrrolone-imide layer on the outer surface of the bag, and the heat-fusion and heat sealing were effected at 250°C. under a pressure of 4 Kg/cm$^2$ for 0.5 second to obtain a sealed package. The peel strength between the tape and the bag proper was about 1,000 g per 20 mm width. The package was heated at 140°C under a pressure of 3 Kg/cm$^2$ for 2 minutes to effect the retorting sterilization, during which exfoliation of the bonded portion or breakage of the bag was not observed. Then, the bag was allowed to stand still at room temperature for 2 weeks. Encased bacon was not tainted by leakages or the like during the above period. The upper part of the bag was taken away along the line 17–17' in FIG. 3–B by hand, and the bacon-encased bag was heated for 3 minutes in an electric toaster to obtain roast bacon of a good taste. During the heating in the electric toaster, generation of a nasty smell or smoke from the bag was not observed. Further, no migration of a nasty smell or flavor into the bacon from the bag-constituting material was detected.

EXAMPLE 18

In the same manner as in Example 18, a bag was prepared except that instead of the urethane adhesive was used an adhesive obtained by mixing 7 parts of an epoxy group-containing resin (having an epoxy equivalent of 330–360) formed by reacting 1 mole of a hydroxyl-terminated polyether (having a hydroxyl value of 320) synthesized from 1 mole of 2,2-bis-(4-hydroxyphenyl)-propane and 2 moles of liquid propylene oxide, with 10 moles of epichlorohydrin in the presence of an alkali catalyst, with 3.5 parts of a polyamide resin (having an amine value of 350 and a viscosity of 500 cps as measured at 20°C.) formed by condensing a polymeric fatty acid with a polyalkylene polyamine, and that the above adhesive was coated on the peripheral ends of two laminate sheets in a thickness of 5 – 10 μ and cured at 164°C. for 2 hours. The peel strength of the bonded portion of the resulting bag was 860 g per 20 mm width.

A beef steak was charged into the so formed bag container, and the sealing was accomplished in the same manner as in Example 17, followed by the retorting sterilization at 140°C. under a pressure of 3 Kg/cm$^2$ for 3 minutes. During the retorting treatment, no exfoliation or breakage of the bonded portion was observed. When the bag was allowed to stand still at room temperature, putrefaction of the contents was not caused to occur by leakages or the like. In the manner as in Example 17 the upper part of the bag was taken away and the bag was heated for 3 minutes in an electric oven of the infrared heater type. Thus, a roast beef steak of a good taste was obtained. During the heating in the electric oven, generation of a smoke or nasty smell, or scorching of the bag was not caused to occur, through the surface temperature of the bag reached 350°C. Further, no migration of a nasty smell or flavor into the content from the bag-constituting material was detected.

EXAMPLE 19

Two aluminum foils having a thickness of 9 μ and an interposing film of a thickness of 12 μ composed of the same polyethylene terephthalate as used in Example 1 were laminated by employing the same urethane adhesive as used in Example 1. Two sheets having a size of 130 mm × 170 mm were cut from the laminated product. With respect to each sheet, the aluminum surfaces were treated at 40°C. for 30 seconds with a 1 percent aqueous solution of sodium phosphate and sodium chromate, and a 15 percent solution in dimethylacetamide of a polybenzimidazole ($\eta_{inh}$=0.25) derived from diaminobenzidine hydrochloride and isophthalyl chloride (molar ratio = 1:1) as monomer components was coated on the so treated surfaces in such an amount that the coating would have a thickness of 2 – 3 μ after drying, following which the baking was conducted at 200°C. for 30 minutes and at 300°C. for 10 seconds. From the so coated sheets was prepared a bag with use of the same adhesive as employed in Example 18 in the same manner as in Example 18. Two slices of ham were charged in the bag and the retorting sterilization was carried out at 140°C. for 3 minutes under an elevated pressure, during which no exfoliation of the bonded portion or breakage of the bag was observed. Further, migration of a nasty smell or flavor into the content from the bag-constituting material was not detected. When the bag was heated for several minutes in a longitudinal toaster, a roast ham of a good taste was obtained.

EXAMPLE 20

The same polyimide imidazopyrrolone-imide resin as used in Example 1 and the same polyamide-imide resin as used in Example 6 were mixed at a weight ratio of 1:0.56, and a 12 percent solution of the above mixture in N-methylpyrrolidone was coated on an aluminum plate having a thickness of 0.26 mm in such an amount that the coating would have a thickness of 5 – 10 μ after drying, following which the baking was carried mon salt, and heated under conditions indicated in Table 4. The surface condition was evaluated based on the scale rated from 0 (the coating was completely exfoliated and eluted away and the aluminum metal substrate was exposed) to 10 (the appearance of the coating was not at all changed by boiling). Results are shown in Table 4.

Table 4

| | Appearance Change by Boiling in High Temperature Saline Water | | | | | | |
|---|---|---|---|---|---|---|---|
| | Polyimide Imidazopyrrolone-Imide/Polyamide-Imide Mixing Ratio | | | | | | |
| | 1/0 | 1/0.145 | 1/0.56 | 1/1.30 | 1/4.04 | 1/11.7 | 0/1 |
| boiled in city water containing 3 % of common salt at 50°C. for 45 hours | 10 | 10 | 10 | 10 | 10 | 10 | 10 |
| further boiled at 100°C. for additional 7 hours | 9 | 10 | 10 | 10 | 10 | 10 | 10 |
| further boiled at 100°C. for still another 9 hours | 8 | 10 | 10 | 10 | 10 | 10 | 10 |
| further boiled at 100°C. for still another 8 hours | 4 | 9 | 9 | 9 | 10 | 10 | 10 | out at 300°C. for 3 minutes. A 80-μ thick film composed of the same nylon-12 as employed in Example 12 was interposed between two aluminum plates coated by the above procedures, and the assembly was pressed at 200°C. under a pressure of 3 Kg/cm² for 30 seconds. The 180° peel strength of the bonded portion of the resulting laminate was 690 g 5 mm width. The peeling strength of the bonded portion of a comparative laminate prepared in the same manner as above except that the polyimide imidazopyrrolone-imide resin alone was used instead of the above resin mixture was 348 g/5 mm width. In the laminate prepared in this example, the resistance against saline water at high temperatures was better than in the above comparative sample.

Figure 9:
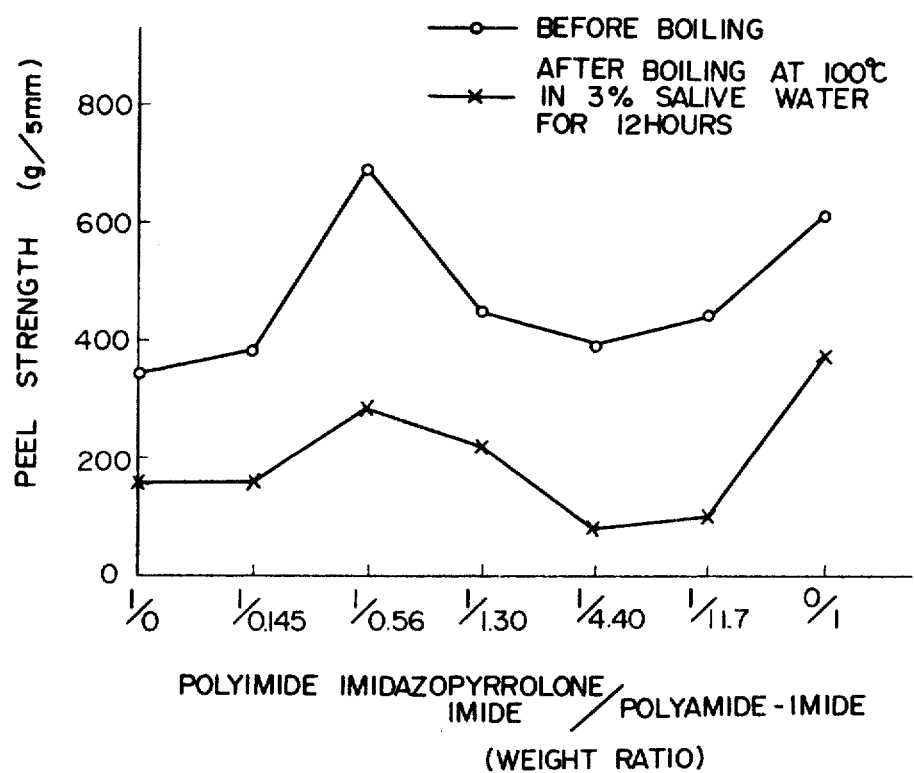
FIG. 9 is a graph illustrating the relation between the peel strength and the weight ratio of polyimide imidazopyrrolone imide and polyamide-imide.

Data of the peel strength and appearance condition of the above two laminates and other laminates formed by employing mixtures of the above two resins at various mixing ratios are shown in FIG. 9 and Table 4.

The tests were conducted by the following procedures.

The mixing ratio (based on the solids) of the polyimide imidazopyrrolone imide resin and the polyamideimide resin was varied from 1.0 to 0:1 as indicated in Table 4, and each of the mixtures was formed into a 12 percent solution in N-methylpyrrolidone. Each solution was coated on an untreated aluminum plate having a thickness of 0.26 mm in such an amount that the coating would have a thickness of 5 – 10 μ after drying, following which the baking was effected at 300°C. for 3 minutes. The so formed ocated aluminum plates were cut into test specimens having a size of 5 mm × 100 mm.

Peel Strength

With respect to each sample, two test specimens were bonded together by employing a nylon-12 film having a thickness of 80 μ under the press-bonding conditions of 200°c., 3 Kg/cm² and 30 seconds, and the 180° peel strength was measured at a stretch rate of 30 mm/min. Results are plotted on the graph of FIG. 9.
Change in Surface Condition by Boiling in Saline Water With respect to each sample, three test specimens were dipped in city water containing 3 percent of com-

EXAMPLE 21

Two aluminum foils having a thickness of 9 μ and an interposing 12-μ thick film of the polyethylene terephthalate film as used in Example 1 were laminated with use of the same urethane adhesive as employed in Example 1 to obtain a laminate sheet (A) having a size of 5 cm × 12 cm. Separately, a 40-μ thick nylon-12 film, an interposing aluminum foil having a thickness of 9 μ and a 12-μ thick polyethylene terephthalate film were laminated with use of the same urethane adhesive as employed in Example 1 to obtain a laminate sheet (B).

A 12 percent solution in dimethylacetamide of the same polyimide imidazopyrrolone-imide resin as used in Example 1 was coated on one surface of the sheet (A) in such an amount that the coating would have a thickness of 5 – 6 μ after drying, and the solvent was completely removed by drying under reduced pressure, following which the baking was conducted by means of an infrared heater, while changing the heating time within a range of from 0 second to 5,400 seconds, so that the temperature of the coated surface was maintained at 200°C. According to the surface reflecting method, the intensity of the absorption inherent of the imide ring at 1,776 cm$^{-1}$ was measured in the infrared spectrum, and the ring closure ratio of the coating was calculated from the equation described in the text of the instant specification.

Figure 10:
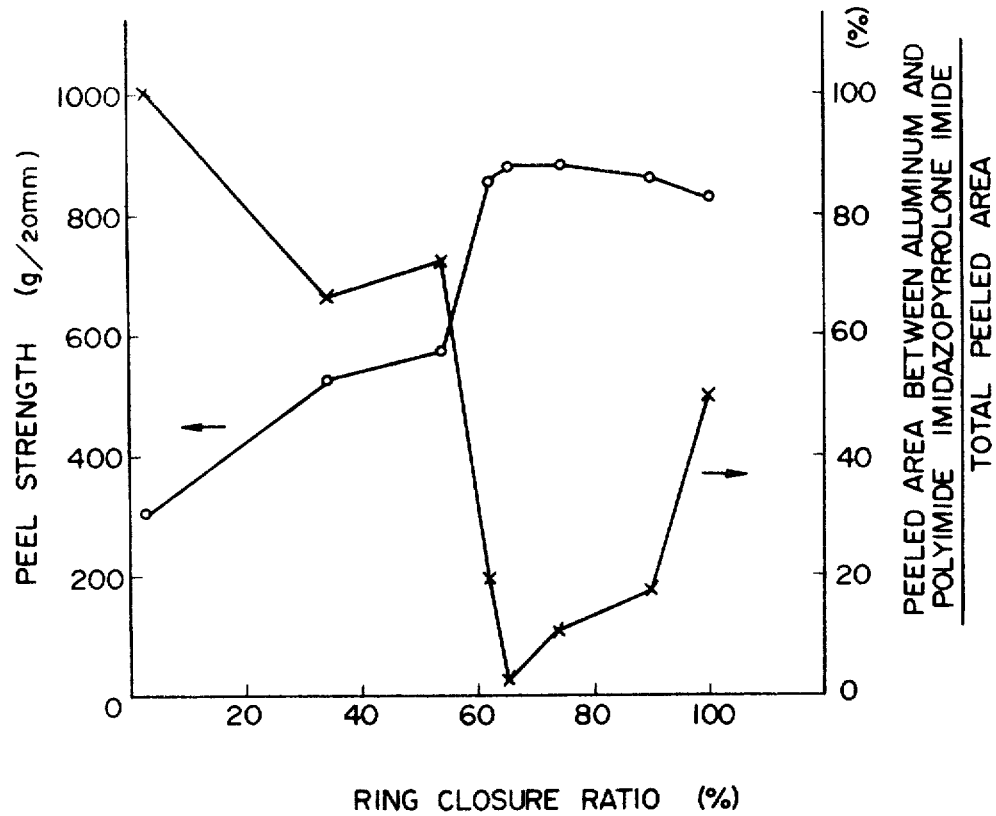
FIG. 10 is a graph illustrating the relation between the peel resistance and the ring closure ratio.

The sheet (B) was placed on the sheet (A) having the coating varying in the ring closure ratio in a manner such that the nylon-12 layer of the sheet (B) was contacted with the coating of the sheet (A), and the heat-adhesion was effected at 260°C. under a pressure of 3 Kg/cm² for 2 seconds. The bonded assembly was boiled in water at 100°C. for 30 minutes and dried at 50°C. under reduced pressure for 4 days. The 180°C peel strength of the so treated bonded assembly was measured by means of a Tensiron tensile tester. The relation between the ring closure ratio and the peel strength is illustrated in FIG. 10.

In order to demonstrate the flavor-retaining property, the extractability by foods and the sealing property of various protective coatings according to this invention and comparative protective coatings, the following tests were conducted.

Flavor Test

With respect to each of resins No. 1 to No. 7, the resin was coated on both surfaces of an aluminum plate having a thickness of 0.26 mm, the coated aluminum plate was charged into a glass ampoule together with pure water, and the glass ampoule was sealed, following which the glass ampoule was heated at 140°C. for 10 minutes under a pressure of 3 Kg/cm² in a retorting vessel and water contained in the ampoule was taken from the ampoule and subjected to the flavor test in the state maintained at 80°C.

With respect to resins No. 8 to No. 12, a piece of a resin film having a thickness of 40 – 70 μ was charged into a glass ampoule together with pure water, and the glass ampoule was sealed and retorted in the same manner as above, following which water contained in the ampoule was taken from the ampoule and subjected to the flavor test in the state maintained at 80°C.

In rach experiment, the amount of pure water charged into the glass ampoule was 20 ml and the surface area of the resin was 1,000 cm².

Results are shown in Table 5. The flavor-retaining property was expressed in terms of the number of men who felt that the water after the retorting treatment had a worse smell or taste than pure water. The total number of men who attended at the test was 23.

Table 5

| Resin No. | Kind of Resin | Smell | Taste | Appearance of Resin After Retorting Treatment |
|---|---|---|---|---|
| Coatings of This Invention | | | | |
| 1 | polyimide imidazopyrrolone-imide[a] | 0 | 1 | not changed |
| 2 | polyamide-imide[b] | 1 | 2 | not changed |
| 3 | polyamide-imide ester[c] | 3 | 6 | not changed |
| 4 | polyimide[d] | 4 | 7 | not changed |
| 5 | polybenzimidazole[e] | 6 | 8 | not changed |
| Comparative Coatings | | | | |
| 6 | silicone[f] | 14 | 19 | whitened |
| 7 | epoxy-phenol[g] | 20 | 21 | water colored into faint yellow |
| 8 | polyethylene[h] | 5 | 3 | molten and converted into massive form |
| 9 | polypropylene[i] | 9 | 5 | not changed |
| 10 | polycarbonate[j] | 8 | 11 | not changed |
| 11 | polyester[k] | 9 | 18 | softened with occurrence of blocking |
| 12 | polyamide[l] | 14 | 20 | not changed |

Notes:
[a] same resin as used in Example 1
[b] same resin as used in Example 6
[c] same resin as used in Example 2
[d] same resin as used in Example 4
[e] same resin as used in Example 19
[f] same resin as used in Comparative Example 2
[g] same resin as used in Comparative Example 1
[h] 70-μ thick high density polyethylene (density=0.955)
[i] 50-μ thick cast polypropylene (density=0.9 – 0.91 ; melting point= 165 – 170°C.)
[j] 50-μ thick polycarbonate film (molecular weight=28,500)
[k] 1,4-cyclohexylenedimethylene terephthalate/isophthalate copolymer (density=1.2)
[l] nylon-12 film as used in Example 1

Extraction Test

With respect to resins No. 1 to No. 7, the resin was coated on an aluminum plate having a surface area of about 1,000 cm² in such an amount that the coating would have a weight of 0.5 – 2.0 g after drying, following which the baking was conducted. With respect to resins No. 8 to No. 12, the resin was tested in the form of a film having thickness of 40 – 70 μ. Each test sample was dipped into an extraction solvent indicated in Table 6, and the extraction was carried out at the boiling point of the solvent for 5 hours. The extract was filtered, and the solvent was evaporated and removed from the filtrate. The amount of the residue was measured. The extractability was evaluated based on the extraction ratio (%) of the amount of the residue based on the amount of the coated resin or film. Resins subjected to the test were the same as used in the flavor test. Results are shown in Table 6.

Table 6

| | | Extraction Ratio (%) | | | |
|---|---|---|---|---|---|
| Resin No. | Kind of Resin | n-Heptane | Chloroform | Ethyl Alcohol/Water (1:1) | Water |
| Coatings of This Invention | | | | | |
| 1 | Polyimide imidazopyrrolone-imide | 0.000 | 0.000 | 0.000 | 0.000 |
| 2 | polyamide-imide | 0.017 | 0.000 | 0.000 | 0.000 |
| 3 | polyamide-imide ester | 0.014 | 0.000 | 0.000 | 0.012 |
| 4 | polyimide | 0.000 | 0.000 | 0.000 | 0.000 |
| 5 | polybenzimidazole | 0.001 | 0.000 | 0.002 | 0.001 |

Table 6 — Continued

| Resin No. | Kind of Resin | Extraction Ratio (%) | | | |
|---|---|---|---|---|---|
| | | n-Heptane | Chloroform | Ethyl Alcohol/Water (1:1) | Water |
| Comparative Coatings | | | | | |
| 6 | silicone | 0.346 | 70.0 | 0.520 | 0.346 |
| 7 | epoxy-phenol | 0.048 | 9.49 | 16.8 | 0.046 |
| 8 | polyethylene | 25.7 | 0.327 | 0.057 | 0.068 |
| 9 | polypropylene | 92.7 | 13.0 | 0.112 | 0.174 |
| 10 | polycarbonate | 0.066 | 100 | 0.069 | 0.041 |
| 11 | polyester | 0.575 | 100 | 0.297 | 0.050 |
| 12 | polyamide | 0.751 | 1.83 | 1.04 | 0.355 |

Sealing Effect Test

With use of each of protective coating resins indicated in Table 7, bags were prepared in the same manner as in Example 17 except that a film of a thickness of 80 μ composed of the same nylon-12 as used in Example 1 was employed as an adhesive for bonding four side ends and the melt-adhesion was carried out at 250°C. under a pressure of 4 Kg/cm² for 0.5 second.

Bacon was charged into the bag and the opening was sealed in the same manner as in Example 17. The retorting sterilization was carried out under an elevated pressure at 120°C. for 30 minutes. The bag was allowed to stand still for one week, and it was examined whether the putrefaction owing to leakages was caused to occur in the encased bacon. The sealing effect is expressed in terms of the number of samples where leakages were observed, among 100 samples subjected to the above test.

With use of each of protective coating resin indicated in Table 7, cans were prepared in the same manner as in Example 10. Air pressurized under 5 Kg/cm² was charged into each can and the can was sealed and put into water to examine whether generation of bubbles was caused to occur. The sealing effect is expressed in terms of the number of samples where bubbles owing to leakages were observed, among 100 samples subjected to the above test.

With respect to each of protective coating resins indicated in Table 7, press-molded containers were prepared in the same manner as in Example 1. Raw bacon was charged into the container and the container was sealed in the same manner as in Example 1. The retorting sterilization was carried out under an elevated pressure at 140°C. for 25 minutes, and the container was allowed to stand still at room temperature for 1 week. Then, it was examined whether putrefaction owing to leakages was caused to occur in the encased bacon.

The sealing effect is expressed in terms of number of samples where leakages were observed, among 100 samples subjected to the above test.

Results are shown in Table 7. Resins No. 1 to 7 tested were the same as those tested in the flavor test. As the fluorine resin (Resin No. 8), a dispersion of a polytetrafluoroethylene (having a melt viscosity at 380°C. of 10 inches poise) in ethyl acetate was employed.

Table 7

| Resin No. | Kind of Resin | Sealing Effect* | | |
|---|---|---|---|---|
| | | Bag | Can | Press-Molded Container |
| Coatings of This Invention | | 0 | 0 | 0 |
| 1 | polyimide imidazopyrrolone-imide | 0 | 0 | 0 |
| 2 | polyamide-imide | 0 | 0 | 0 |
| 3 | polyamide-imide ester | 0 | 0 | 0 |
| 4 | polyimide | 2 | 3 | 4 |
| 5 | polybenzimidazole | 4 | 7 | 3 |
| Comparative Coatings | | | | |
| 6 | silicone | 16 | 23 | 12 |
| 7 | epoxy-phenol | 0 | 0 | 0 |
| 8 | fluorine resin | 100 | 100 | 100 |

*: number of samples where occurrence of leakages was observed, among 100 samples subjected to the test.

What is claimed is:

1. A heatable package of food comprising a food product encased in a packaging container, said packaging container being composed of at least one sheet material comprising a metal sheet having a thickness of 5 to 500 microns and a protecting coating layer of heat resistant resin formed on at least the inner food contacting surface of said metal sheet, said protecting layer being composed of a polyimide imidazopyrroloneimide having a thickness of 1 to 10 microns.

2. A heatable package of food set forth in claim 1, wherein said polyimide imidazopyrrolone-imide consists essentially of (A) recurring units of polyimide and (B) recurring units of polyimidazopyrrolone-imide, the molar ratio of (A) units/(B) units being within a range of from 1/9 to 9/1.

3. A heatable package of food set forth in claim 1, wherein said polyimide imidazopyrrolone-imide consists essentially of the recurring unit having the following formula:

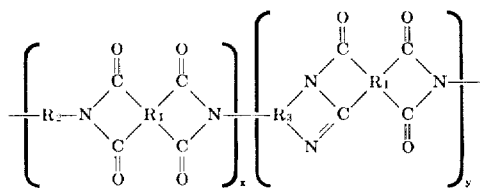

wherein $R_1$ is a tetra-valent group selected from the group consisting of aromatic, aliphatic, alicyclic and aromatic-aliphatic tetra-valent groups, $R_2$ is a di-valent group selected from the group consisting of aromatic, aliphatic, alicyclic and aromatic-aliphatic di-valent groups, $R_3$ is a tri-valent group selected from the group consisting of aromatic, aliphatic, alicyclic and aromatic-aliphatic tri-valent groups, and $x$ and $y$ are numbers taking a ratio of $x/y$ ranging from 1/9 to 9/1.

4. A heatable package of food set forth in claim 1, wherein said polyimide imidazopyrrolone-imide has a ring closure ratio of from 50 to 95 percent, defined by the following formula:

ring closure ratio (%) = 100 × A/B wherein A stands for the value expressed by the formula (log$I/Io$) 1776 cm$^1$ /(log$I/Io$) 1550 cm$^1$ 411 obtained with respect to the sample to be tested, and B stands for the value expressed by the formula (log$I/Io$) 1776 cm$^1$ /(log$I/Io$) 1500 cm$^1$ obtained with respect to the sample obtained by heating the sample to be tested until increase of the imide ring was not detected any more, and I stands for the percent transmission of the resin at the indicated wavelength and Io stands for the percent transmission of the background at the same wavelength.

5. A heatable package of food comprising a food product encased in a packaging container, said packaging container being composed of at least one sheet material comprising a metal sheet having a thickness of 5 to 500 microns and a protecting coating layer of heat resistant resin formed on at least the inner food contacting surface of said metal sheet, said protecting coating layer having a thickness of 1 to 10 microns and being composed of a blend composition of (A) a polyimide imidazopyrrolone- imide and (B) a polyamideimide or polyamideimide ester at a mixing weight ratio of (A) : (B) ranging from 1 : 0.06 to 1 : 25.

6. A heatable package of food which comprises a food product encased in a sealed bag composed of two flexible sheet materials, said bag being sealed at all end portions thereof, each flexible sheet material comprising a metal sheet having a thickness of 5 to 100 microns and protecting coating layers of heat resistant resin having a thickness of 1 to 10 microns formed on the inner food contacting surface and the outer surface of said metal sheet, said heat resistant resin being selected from the group consisting of (1) a polyimide imidazopyrroloneimide consisting essentially of (A) recurring units of polyimide and (B) recurring units of polyimidazopyrroloneimide, the molar ratio of (A) units/ (B) units being within a range of from 1/9 to 9/1, and (2) a blend composition of (a) a polyimide imidazopyrrolone-imide and (b) a polyamideimide or polyamideimide ester at mixing weight ratio of (a) : (b) ranging from 1 : 0.06 to 1 : 25, each of the said sealed end portions of the bag being formed by a heat seal thermoplastic resin selected from the group consisting of polyamides and polyester, said heat seal thermoplastic resin layer being disposed in contact with said protective coating layers.

7. A heatable package of food which comprises a food product encased in a sealed bag composed of two flexible sheet materials, said bag being sealed at all end portions thereof, each flexible sheet material comprising a metal sheet having a thickness of 5 to 100 microns and protecting coating layers of heat resistant resin having a thickness of 1 to 10 microns formed on the inner food contacting surface and the outer surface of said metal sheet, said heat resistant resin being selected from the group consisting of (1) a polyimide imidazopyrroloneimide consisting essentially of (A) recurring units of polyimide and (B) recurring units of polyimidazopyrroloneimide, the molar ratio of (A) units/(B) units being within a range of from 1/9 to 9/1, and (2) a blend composition of (a) a polyimide imidazopyrrolone-imide and (b) a polyamideimide or poylamideimide ester at mixing weight ratio of (a) : (b) ranging from 1 : 0.06 to 1 : 25, each of the said sealed end portions of the bag being formed by an adhesive which is disposed in contact with said protective coating layers, the said adhesive being composed of a thermosetting resin selected from the group consisting of epoxy resins and polyurethane resins, one of the said flexible sheet materials being provided with an opening for packing a food product at the upper part thereof, a sealing flexible sheet consisting of a metal foil having on one surface a protective coating layer and having on the other surface a heat-sealable resin layer being applied so as to cover completely said opening, said heat-sealable resin layer of said sealing flexible sheet being melt-bonded to the said protecting coating layer of the heat resistant resin of said flexible sheet material.

8. A heatable package of food set forth in claim 7, wherein the metal sheet is an aluminum sheet.

9. A heatable sealed package of food comprising a precooked food product encased in a packaging container, said packaging container consisting of a can comprising a tube-like can shell provided with flange members at the opposite ends thereof, can end members, and seamed portions formed between each flange member of the can shell and the respective end member, said can shell being formed by lapping both side edges of a plate-like metal blank and lap-bonding them by heat fusion of a thermoplastic resin interposed between the confronting surfaces of both side edges of the metal blank, said plate-like metal blank having at least on the inner food contacting surface of the can shell a protective coating layer of heat resistant resin having a thickness of 1 to 10 microns, and said confronting surfaces of the side edges of the plate-like metal blank being lap-seamed by heat fusion of a layer of a thermoplastic resin selected from the group consisting of polyamides and polyesters, which is disposed in contact with said protective coating layer said heat resistant resin being selected from the group consisting of (1) a polyimide imidazopyrrolone-imide consisting essentially of (A) recurring units of polyimide and (B) recurring units of polyimidazopyrrolone-imide, the molar ratio of (A) units/(B) units being within a range of from 1/9 to 9/1, and (2) a blend composition of (a) a polyimide imidazopyrrolone-imide and (b) a polyamideimide or polyamideimide ester at mixing weight ratio of (a) : (b) ranging from 1 : 0.06 to 1 : 25.

10. A heatable package of food which comprises a food product encased in a container said packaging container consisting of an open container member provided with a food-encasing portion and a flange member formed along the periphery of the food-encasing portion, and a lid member composed of a sheet material closing said container members, said container member consisting of a metal sheet having a thickness of 50 $\mu$ to 500 $\mu$ and a protective coating layer, formed at least on the inner food contacting surface of the metal sheet, of a heat resistant resin having a thickness of 1 μ to 10 μ, and a sealed portion is formed between the flange member of said container member and said lid member by heat sealing of a layer of a thermoplastic resin selected from the group consisting of polyamides and polyesters which is disposed in contact with the protective coating layer of said container member, said heat resistant resin being selected from the group consisting of (1) a polyimide imidazopyrroloneimide consisting essentially of (A) recurring units of polyimide and (B) recurring units of polyimidazopyrroloneimide, the molar ratio of (A) units/(B) units being within a range of from 1/9 to 9/1, and (2) a blend composition of (a) a polyimide imidazopyrroloneimide and (b) a polyamideimide or polyamideimide ester at mixing weight ratio of (a) : (b) ranging from 1 : 0.06 to 1 : 25.

11. A heatable package of food set forth in claim 10, wherein the metal sheet is a steel plate.

12. A heatable package of food set forth in claim 10, wherein the metal sheet is a steel plate having a chromium oxide film in an amount, reckoned as metallic chromium, of 50 to 1,500 μg/dm$^2$.

* * * * *